United States Patent
Liu et al.

(10) Patent No.: US 12,554,260 B2
(45) Date of Patent: Feb. 17, 2026

(54) ITERATIVE FEEDBACK MOTION PLANNING

(71) Applicant: University of South Carolina, Columbia, SC (US)

(72) Inventors: Zhichao Liu, Novi, MI (US); Bin Zhang, Irmo, SC (US)

(73) Assignee: University of South Carolina, Columbia, SC (US)

( * ) Notice: Subject to any disclaimer, the term of this patent is extended or adjusted under 35 U.S.C. 154(b) by 96 days.

(21) Appl. No.: 16/804,094

(22) Filed: Feb. 28, 2020

(65) Prior Publication Data

US 2020/0278686 A1 Sep. 3, 2020

Related U.S. Application Data

(60) Provisional application No. 62/840,497, filed on Apr. 30, 2019, provisional application No. 62/840,485, filed on Apr. 30, 2019, provisional application No. 62/811,597, filed on Feb. 28, 2019.

(51) Int. Cl.
*G05D 1/00* (2024.01)
*G05B 13/02* (2006.01)
*G05B 13/04* (2006.01)

(52) U.S. Cl.
CPC ....... *G05D 1/0221* (2013.01); *G05B 13/0265* (2013.01); *G05B 13/048* (2013.01); *G05D 1/0088* (2013.01); *G05D 1/0214* (2013.01)

(58) Field of Classification Search
CPC .. G05D 1/0221; G05D 1/0088; G05D 1/0214; G05D 2201/0213; G05B 13/0265; G05B 13/048
See application file for complete search history.

(56) References Cited

U.S. PATENT DOCUMENTS

| | | | |
|---|---|---|---|
| 9,045,118 B2 * | 6/2015 | Taguchi | B60W 10/20 |
| 10,407,035 B1 * | 9/2019 | Gadda | B60W 10/04 |
| 10,831,210 B1 * | 11/2020 | Kobilarov | B60W 60/0013 |
| 2008/0125875 A1 * | 5/2008 | Stewart | G05B 13/024 700/20 |
| 2018/0267537 A1 * | 9/2018 | Kroop | B60W 30/10 |
| 2018/0354513 A1 * | 12/2018 | Moshchuk | B62D 6/002 |
| 2019/0286151 A1 * | 9/2019 | Palanisamy | G08G 1/096816 |
| 2020/0089241 A1 * | 3/2020 | Kao | G05D 1/0217 |
| 2020/0211394 A1 * | 7/2020 | King | G05D 1/0289 |
| 2021/0179140 A1 * | 6/2021 | Zhu | G05D 1/0212 |
| 2021/0208596 A1 * | 7/2021 | Tong | B62D 15/02 |

\* cited by examiner

*Primary Examiner* — Mohamad O El Sayah
(74) *Attorney, Agent, or Firm* — Offit Kurman; Douglas L. Lineberry

(57) ABSTRACT

Establishing a feedback connection between a motion planner and a motion controller in an autonomous driving system wherein feedback is iteratively updated and able to improve motion controller performance.

18 Claims, 39 Drawing Sheets

TABLE I
TRAJECTORY TRACKING ERROR COMPARISON

|  | Lateral error (m) | | Heading error (deg) | |
|---|---|---|---|---|
|  | Trad | ITO | Trad | ITO |
| Winding road | 0.4627 | 0.0758 | 7.2801 | 3.6358 |
| Single-lane change | 0.0668 | 0.0375 | 1.6207 | 1.1919 |
| Double-lane change | 0.0345 | 0.0166 | 1.1175 | 0.8912 |

FIG. 9

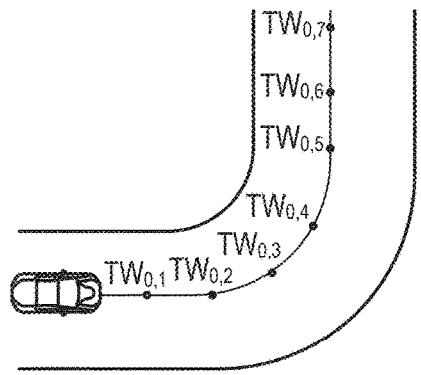

FIG. 14A

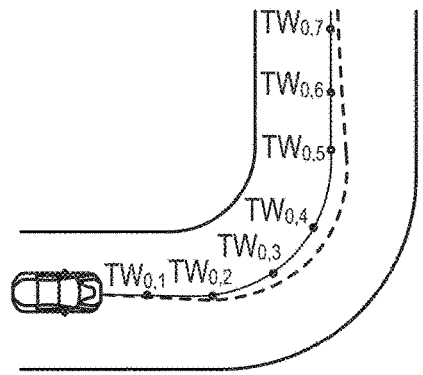

FIG. 14B

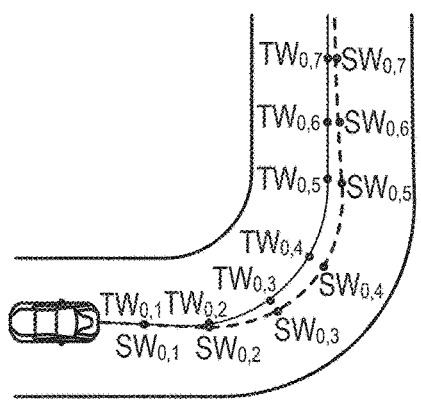

FIG. 14C

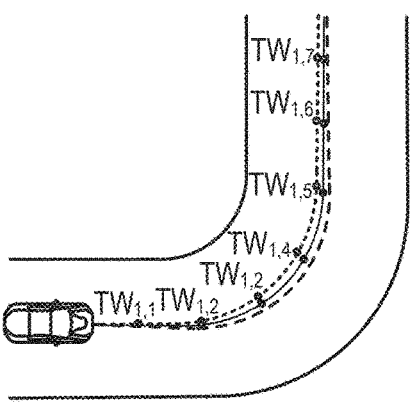

FIG. 14D

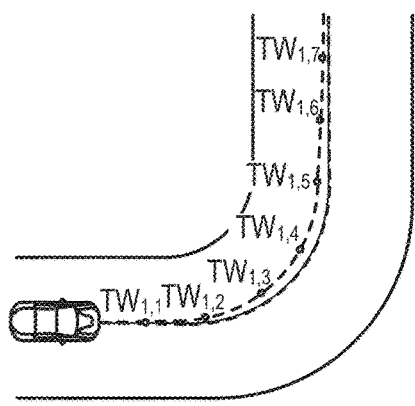

FIG. 14E $TW_{0,i}$ ● : initial trajectory waypoint $i$ from motion planning $TW_{j,i}$ ○ : adjusted trajectory waypoint $i$ of $j$-th iteration from motion planning $SW_{j,i}$ ● : simulated waypoint $i$ based on $j$-th iteration trajectory from motion control simulator ——— : initial motion trajectory from motion planning

- - - - - : adjust motion trajectory from motion planning

— — — : simulated trajectory from motion control simulator $TW_i$ • : initial trajectory waypoint $i$ from motion planning
$SW_{j,i}$ • : simulated waypoint $i$ based on $j$-th iteration trajectory from motion control simulator
——— : initial motion trajectory from motion planning
------ : adjust motion trajectory from motion planning
- - - : simulated trajectory from motion control simulator
↑ : control input offset

ITERATIVE FEEDBACK MOTION PLANNING

BACKGROUND OF THE INVENTION

1) Field of the Invention

The present invention relates to establishing a feedback connection between a motion planner and a motion controller in an autonomous driving system wherein feedback is iteratively updated and able to improve motion controller performance.

2) Description of Related Art

Autonomous driving is a fast-developing area and market. Autonomous driving technology has been developing rapidly over the last few years, and such technology offers great promise and potential benefits. Motion planning and control are two important modules in the autonomous driving system. Motion planning needs to configure a collision-free, physically and operationally feasible, as well as comfortable motion trajectory to enable the vehicle to operate safely and efficiently in traffic. For the motion controller, it drives the vehicle close to the motion planning trajectory and keeps the vehicle safe and comfortable under different kinds of road obstacles and disturbances.

Traditional motion planning mainly consists of two parts: trajectory generation and trajectory optimization, as shown in FIG. 1. Trajectory generation first generates the motion trajectory candidates while considering the road shape, obstacle collision avoidance, and physical dynamics. Various techniques have been proposed and implemented for trajectory generation including the graph search based method, incremental search method (e.g. RRT* and fast marching tree), and optimization based methods (e.g., sequential quadratic programming and dynamic programming methods). For trajectory optimization, the goal is to make the trajectory safer, smoother, and more comfortable and selects the optimal trajectory based on the cost function. Others have presented a conjugate gradient method to smooth the path result; and others propose separate optimization for both path and speed space. Yet other attempts include the model predictive based method applied to optimize the selected trajectory; in addition, other researchers have used some geometric and polynomial methods to provide smooth trajectories.

However, the traditional trajectory optimization methods have several issues. First, the trajectory generation only applies to a simple vehicle model for the computation cost saving, so it cannot guarantee the generated trajectory can be accurately tracked especially at the winding road scenario. Second, the traditional motion planner does not provide any compensation to decrease the potential tracking error of the motion controller. Third, because of the single direction signal between the motion planner and motion controller, the motion planner does not have any prediction on the deviation of the motion controller tracking. When the deviation leads to the potential collision, the motion planner will not have enough time to regenerate a motion trajectory.

As driving technology continually improves, the arrival of the truly autonomous or "self-driving" vehicle heralds new technological challenges in order to ensure implementation of fully autonomous vehicles will occur as smoothly as possible without undue disruption to traffic and travel patterns. An autonomous vehicle can guide itself without human conduction. This kind of vehicle has become a concrete reality and may pave the way for future systems where computers take over the art of driving. Autonomous driving is a fast-developing area and market with hundreds of companies doing related work and the currently anticipated market size is approximately $126.8 billion by 2027.

"Self-driving" means the autonomous driving of a vehicle to a specific target in real traffic without the intervention of a human driver. Such a vehicle receives its input data primarily from visual information sources that are also available to the driver. In the preliminary stages of autonomous driving, technology enhanced a driver's awareness by providing information that enabled him or her to make a decision and react quickly. But when a vehicle reacts autonomously—without active intervention from a driver—through algorithms that force the vehicle to react in a specific way, one speaks of autonomous driving. In a fully automated system, the system can handle all situations autonomously; there is no need for monitoring by the driver. The driver is allowed to perform non-driving tasks. Driverless driving is also possible at this level.

In an autonomous driving system (ADS), behavior and motion planning generate a motion trajectory reference for the motion controller. The generated trajectory needs to be collision-free, comfortable, feasible, and low-time-consuming. To achieve these goals, it requires that the behavior and motion planning have high resolution motion trajectory. However, high trajectory resolution will require more computation cost from an ADS. In practice, the computation resolution is based on a fixed time interval or fixed distance considering the tradeoff between high resolution and computation cost. Accordingly, it is an object of the present invention to provide a method that can maintain both high waypoint resolution and low computation cost needed for an ADS.

Accordingly, it is an object of the present disclosure to establish a feedback connection between motion planning and motion controller in an autonomous driving system wherein feedback is iteratively updated and able to improve motion controller performance.

SUMMARY OF THE INVENTION

In a first embodiment, the current disclosure provides a feedback connection system between motion control and motion planning for an autonomous driving vehicle. The system may include a motion controller, wherein the motion controller further includes an iterative motion simulator, wherein the iterative motion simulator simulates a vehicle trajectory response while updating a trajectory offset and a motion control operator that evaluates the simulated vehicle trajectory. The system may also have a motion planner that evaluates the simulated trajectory for response effectiveness. The motion controller may receive a trajectory offset from the motion planner and may calculate a vehicle control maneuver based on the trajectory offset. Further, the motion planner may generate a motion trajectory for a time horizon and the motion control operator may execute a motion planning trajectory for the time horizon.

Still further, the motion controller may include a lateral controller and a longitudinal controller. Further yet, the trajectory offset may be derived as $\Delta P_i = \Delta P_{i-1} + K_{ILC} E_i$. Still yet further, a tracking error may obtained as $E_i = P_0 - S_i = \{e_1 e_2, \ldots, e_n\}_i$. Still further yet, the trajectory offset and the tracking error may be sent to the motion planner as feedback information. Again, the simulated vehicle trajectory may be obtained from $S_i = \{s_0, s_1 \ldots s_n\}_i$. Still again, if the simulated trajectory does not meet a motion planning requirement this may trigger a motion trajectory regeneration. Further yet, if the simulated trajectory does not meet a mission and behavior planning requirement, at least one alternative simulated trajectory may be created by the motion planner. Further again, once the simulated trajectory meets the mission and behavior planning, the motion control operator may execute the simulated trajectory until reaching a destination.

In a further embodiment, an iterative feedback motion planning system may be provided. The system may include a motion planner that generates an initial motion trajectory via a set of trajectory waypoints with a fixed time interval, a motion control simulator that estimates a vehicle simulated trajectory in view of the trajectory waypoints and simulated waypoints corresponding to the trajectory waypoints are selected from the vehicle simulated trajectory; a tracking error that may be generated by comparing the simulated waypoints to the trajectory waypoints; the tracking error may be sent to the motion planner as a feedback signal and adjusted motion trajectory waypoints are obtained from the motion planner; the motion control simulator may apply the adjusted motion trajectory waypoints and creates an updated simulated trajectory and further simulated waypoints; and the motion control simulator may determine if a satisfied simulation performance and a final adjusted motion trajectory is sent to a motion control operator.

Further, each trajectory waypoint may comprise X and Y coordinates, heading angle, linear velocity and acceleration. Still further, the tracking error may be defined as $E_{o,i}=(TW_{o,i}-TW_{o,i})$. Again, the adjusted motion trajectory waypoints may be obtained via $TW_{(j+1),n}=TW_{j,n}+KE_{j,n}$. Still further, an adjusting process may be applied until the satisfied simulation performance is obtained when $E_j^T Q E_j < \varepsilon$. The iterative feedback motion planning system may include a lateral controller. Further yet, an optimal lateral feedback gain for a varying longitudinal velocity may be obtained and communicated to the motion controller. Still yet, the motion controller may be a LQR-based motion controller. Still again, a look-up table may be applied to expedite LQR computation.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 9 shows Table 1.

FIG. 14 shows an example of the proposed iterative feedback motion planning.

Figure 1:
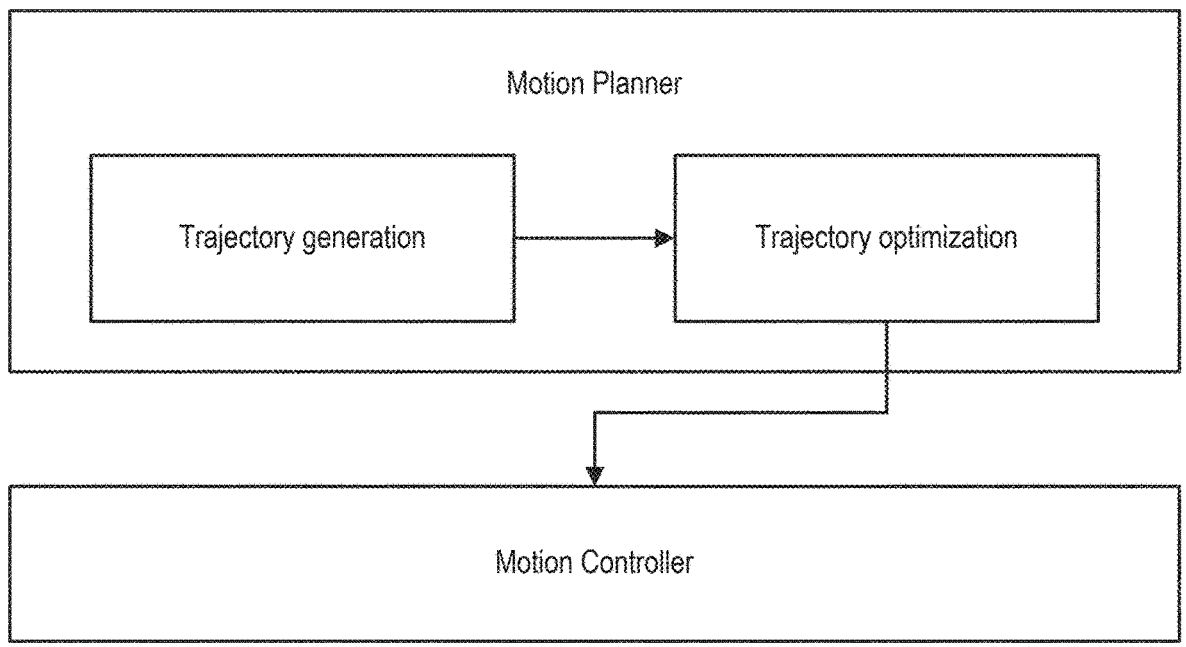
FIG. 1 shows a traditional structure of a motion planner and motion controller.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

For an autonomous driving system, motion planning generates a motion trajectory for a motion controller to execute. The normal signal communication between motion planning and motion controller is a one-way process. The proposed iterative method of the current disclosure uses a motion control simulation result as the feedback signal for motion planning. Thus, motion planning adjusts the motion trajectory iteratively based on the feedback information.

The current disclosure establishes a feedback connection between motion control and motion planning for an autonomous driving vehicle. The proposed method adjusts motion planning trajectory iteratively by adjusting a motion trajectory offset. This adjustment improves the motion control tracking performance.

For autonomous driving, motion planning and motion control are two significant modules. With respect to the current disclosure, the iterative trajectory optimization (ITO) method is proposed to improve the motion controller's tracking performance and increase the physical and operational feasibility of the motion planning trajectory.

Based on the proposed scheme, a feedback connection is built from the motion controller to the motion planner. Different from the traditional motion controller, the motion controller of the current disclosure is divided into two sub-modules: (1) an iterative motion simulator; and (2) a motion control operator. In the iterative motion simulator, the vehicle trajectory response is simulated while updating a trajectory offset iteratively. This offset will correct the vehicle response closer to the reference trajectory. After the iterative trajectory adjustment finishes, the simulated tracking error and trajectory offset are sent back to the motion planner. The motion planner will first evaluate the simulated trajectory to see the response effectiveness, and then the trajectory with the offset is finally sent to the motion control operator to calculate the vehicle control maneuver. Compared with the tradition motion planning scheme, the proposed ITO approach can guarantee the trajectory's physical and operational feasibility, improve tracking performed of the motion controller, and have a predictive evaluation on the vehicle response. The simulation results demonstrate the effectiveness of the proposed method.

For the current disclosure, an iterative trajectory optimization (ITO) approach is proposed by building a feedback connection from the motion controller to the motion planner. In this method, the motion controller is divided into two parts: motion simulator, and motion control operator. Both parts are based on the same vehicle model and controller design. The generated motion trajectory is first sent to the motion simulator. The simulation operates for n times, and it iteratively updates a trajectory offset to adjust the trajectory response closer to the reference trajectory. The iterative trajectory offset updates after every simulation based on the idea of iterative learning control. After the iterative motion simulation finishes, the simulated tracking error and the final trajectory offset are sent back as the feedback information. The motion planner needs to verify the effectiveness of the final simulator trajectory. If it meets the requirement, the motion planner sends the initial trajectory with the final trajectory offset to motion control operator to calculate the vehicle control maneuver. Otherwise, the motion planner needs to regenerate a motion trajectory and repeat the process again.

Section II of the current disclosure provides a brief description of the vehicle dynamic model and LQR controller design. Section III introduces the feedback motion planning structure, ITO, simulation evaluation, and real-time application strategy in detail. Two simulation results and a number of numerical results are provided to show how the motion planning strategy improves the tracking performance, and in one scenario, the motion planner predicts an operational unfeasible trajectory. The conclusion is summarized in Section V.

II. Vehicle Model and Optimal Controller Design

A. Vehicle Dynamic Model

Figure 2:
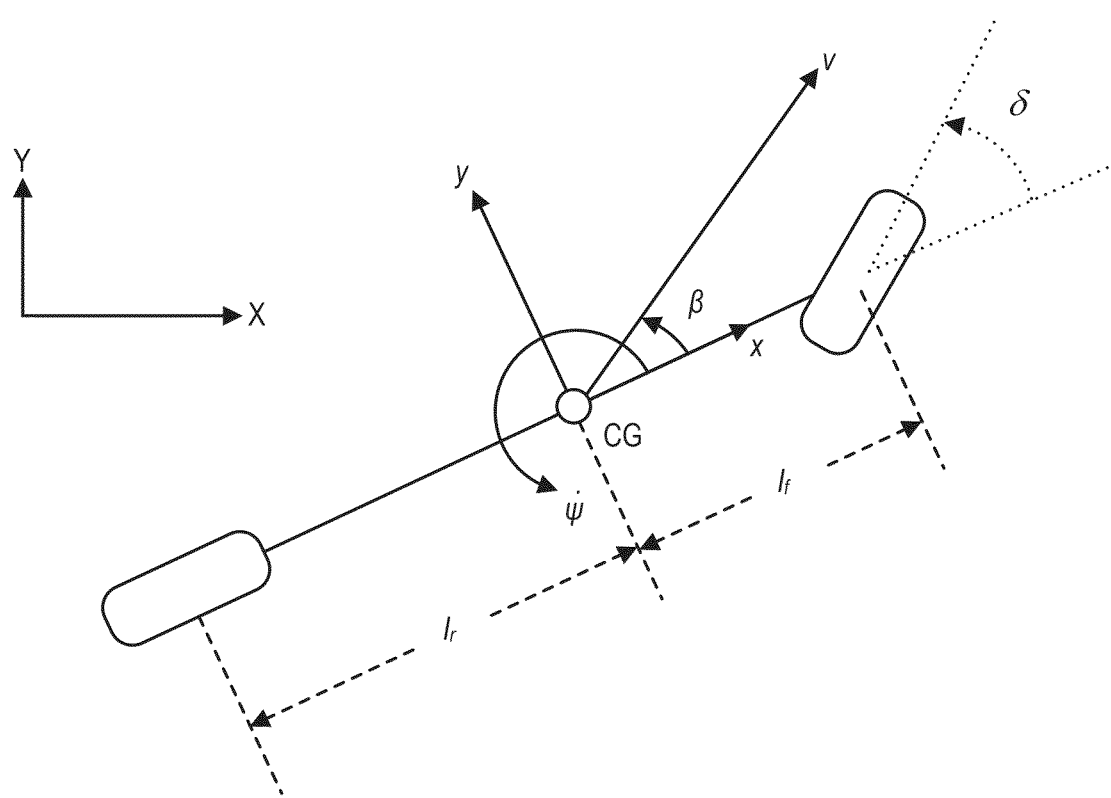
FIG. 2 shows a simplified vehicle dynamic model of the current disclosure.

To simplify the vehicle modeling complexity, the bicycle model as shown in FIG. 2 is used for motion controller design, where $l_f$ and $l_r$ are distances of front and rear wheels from center of gravity (CG), $\delta$ is the steering angle, v is vehicle velocity based on CG, $\beta$ is the slip angle of the vehicle, x and y denote the longitudinal and lateral direction of the vehicle body frame, and X and Y denote the absolute car position inertial coordinates. FIG. 2 is a simplified vehicle dynamic model of the current disclosure.

The velocity of each wheel will no longer move in their heading directions, so the dynamic model represents the vehicle motion more accurately than the kinematic model. The dynamics of the bicycle model are built from $$m\ddot{x} = m\dot{y}\dot{\Psi} + 2F_{xf} + 2F_{xr} \quad (1)$$

$$m\ddot{y} = -m\dot{x}\dot{\Psi} + 2F_{yf} + 2F_{yr} \quad (2)$$

$$I_z\ddot{\Psi} = 2l_f F_{yf} - 2l_r F_{yr} \quad (3)$$

where $\dot{x}$ and $\dot{y}$ denote the longitudinal and lateral velocity in the vehicle body frame, $\ddot{x}$ and $\ddot{y}$ denote the longitudinal and lateral acceleration, m and $I_z$ denote the vehicle's mass and yaw inertia, and F denotes the force on the vehicle body in which the subscripts x and y denote the longitudinal and lateral directions and f and r denote the front and rear wheels.

To effectively drive the vehicle to the desired motion, the vehicle motion controller is divided into two sub-controllers: (1) lateral controller; and (2) longitudinal controller. For the longitudinal dynamic control, a simple PI controller has provided good enough longitudinal velocity and distance control. For accurately controlling the lateral dynamic, it is still a challenging task.

B. Vehicle Lateral Dynamics

Considering vehicle dynamics on lateral direction, the front and rear tire forces are:

$$F_{yf} = C_f \left( \delta - \frac{\dot{y} + l_f \dot{\psi}}{\dot{x}} \right) \quad (4)$$

$$F_{yr} = C_r \left( \frac{\dot{y} + l_f \dot{\psi}}{\dot{x}} \right) \quad (5)$$

where $C_f$ and $C_r$ are the cornering stiffness of front each rear tire.

The vehicle dynamic model can be converted to the state space based on the lateral error $e_1$ and heading error $e_2$ with respect to the desired lateral position ydes heading $\Psi$des as:

$$\dot{x} = Ax + B_1\delta + B_2\dot{\Psi}_{des} \quad (6)$$

where $$x = [\, e_1 \quad \dot{e}_1 \quad e_2 \quad \dot{e}_2 \,]^T;$$

$$A = \begin{bmatrix} 0 & 1 & 0 & 0 \\ 0 & -\frac{2(C_f + C_r)}{m\dot{x}} & \frac{2(C_f + C_r)}{m} & \frac{2(C_r l_r - C_f l_f)}{m\dot{x}} \\ 0 & 0 & 0 & 1 \\ 0 & \frac{2(C_r l_r - C_f l_f)}{I_z \dot{x}} & \frac{2(C_f l_f - C_r l_r)}{I_z} & -\frac{2(C_f l_f^2 + C_r l_r^2)}{I_z \dot{x}} \end{bmatrix}$$

$$B_1 \begin{bmatrix} 0 & \frac{2C_f}{m} & 0 & \frac{2C_f l_f}{I_z} \end{bmatrix}^T$$

$$B_2 = \begin{bmatrix} 0 & \frac{C_r l_r - C_f l_f}{m\dot{x}} - \dot{x} & 0 & -\frac{2(C_f l_f^2 + C_r l_r^2)}{I_z \dot{x}} \end{bmatrix}^T$$

C. Optimal Lateral Controller Design

Based on the state space (6), the optimal state feedback control has the form as:

$$\delta^* = -K_x = -(k_1 e_1 + k_2 \dot{e}_1 + k_3 e_2 + k_4 \dot{e}_2) \quad (7)$$

To optimize the controller design, a discrete time finite-horizon linear quadratic regulator (LQR) is utilized with a cost function of a n step horizon window:

$$J = \sum_{i=0}^{n} (x_i^T Q x_i + u_i^T R u_i) \quad (8)$$

where $x_i$ is the discrete state of x and $u_i$ is the discrete input $\delta$ in Eq. (6) with the sampling time $t_s$, and Q and R are the diagonal weighting matrix. The optimal feedback gain K is derived as the form of:

$$K = (R + B_{1d}^T P B_{1d})^{-1} B_{1d}^T P A_d \quad (9)$$

and P is the unique positive definite solution to the discrete time algebraic Riccati equation:

$$P = A_d^T P A_d - A_d^T P B_{1d} (R + B_{1d}^T P B_{1d})^{-1} B_{1d}^T P A_d + Q \quad (10)$$

where $A_d$ and $B_{1d}$ are the discrete time state space of A and $B_1$ in (6).

In addition, another feed-forward controller will be added to eliminate the influence of the constant term $B_2\dot{\Psi}$des and to cancel the steady-state tracking error.

III. Iterative Trajectory Optimization

Motion Planning and Control

A. Feedback Motion Planning Structure

For the traditional motion planner, it mainly contains of two steps:
trajectory generation and trajectory optimization shown in FIG. 1. A set of path and trajectory are generated first, and then the trajectory optimization chooses the best trajectory based on the cost function among the trajectory candidates and makes the selected trajectory smoother and satisfy a number of constraints.

The traditional data flow between the motion planner and motion controller is in a single direction. The reference motion trajectory is sent to the motion controller to derive the autonomous vehicle operation maneuver (acceleration, deceleration, and steering).

Figure 3:
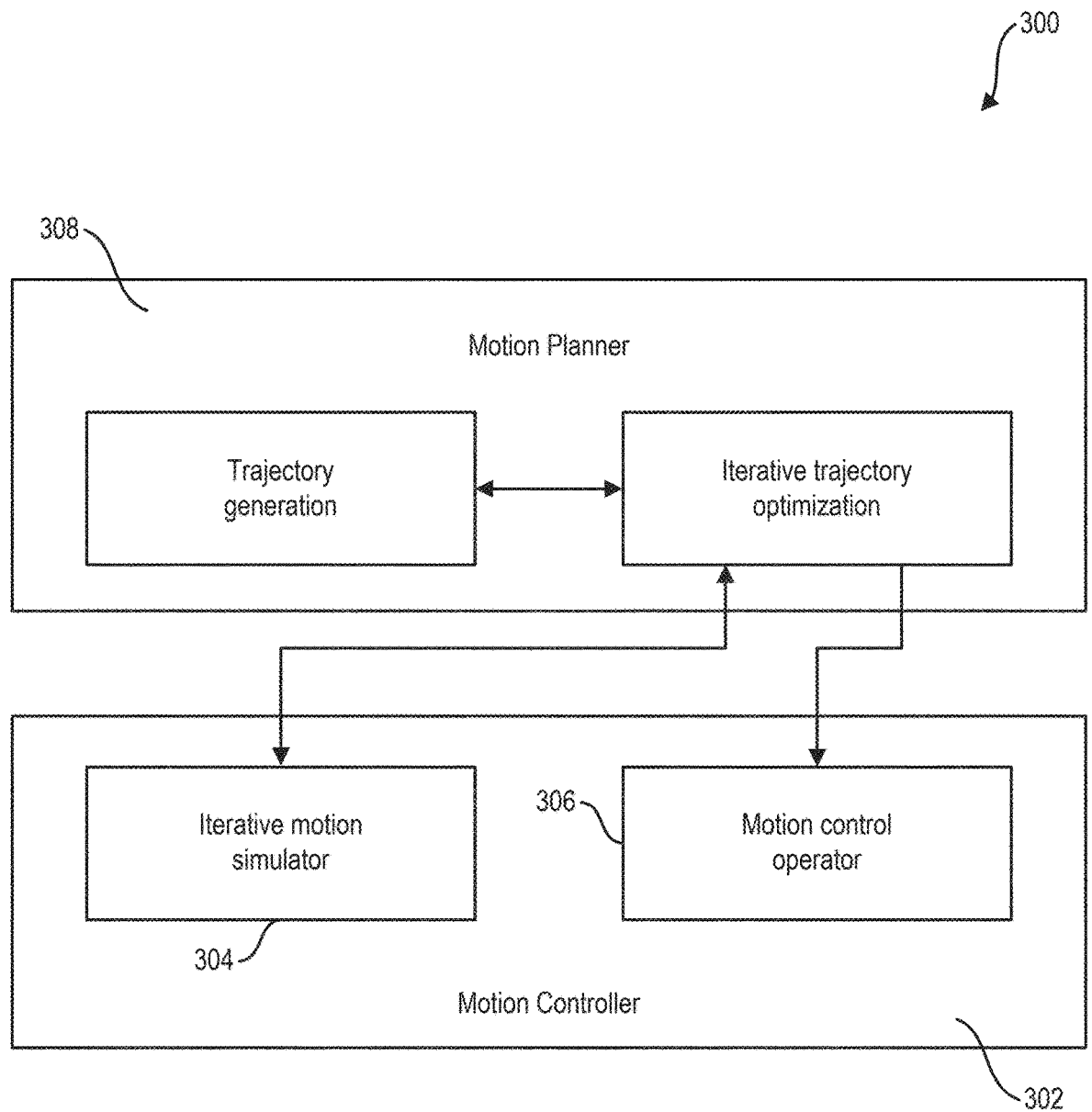
FIG. 3 shows a proposed structure of ITO motion planning of the current disclosure.

For the current disclosure, an ITO based motion planning as shown in FIG. 3 is proposed to solve the issues of traditional motion planning optimization. FIG. 3 shows a proposed structure of ITO motion planning 300 for the current disclosure. In the proposed structure, motion controller 302 is divided into two parts: (1) motion simulator 304; and (2) motion control operator 306. The initial reference trajectory from the traditional optimization method is first sent to the motion control simulator to get the vehicle simulated trajectory. Based on the idea of iterative learning control, this simulation repeats iteratively by updating a trajectory offset. When meeting the termination condition, the final simulated trajectory and final trajectory offset are derived. If the final simulated trajectory does not meet the requirement, e.g. collision-free, motion planner 308 needs to re-select a trajectory candidate and repeats the optimization process. If the requirement is met, the reference trajectory with the final offset will be sent to the motion control operator. The process detail is introduced in the Section III-B.

B. Iterative Trajectory Optimization

Figure 4:
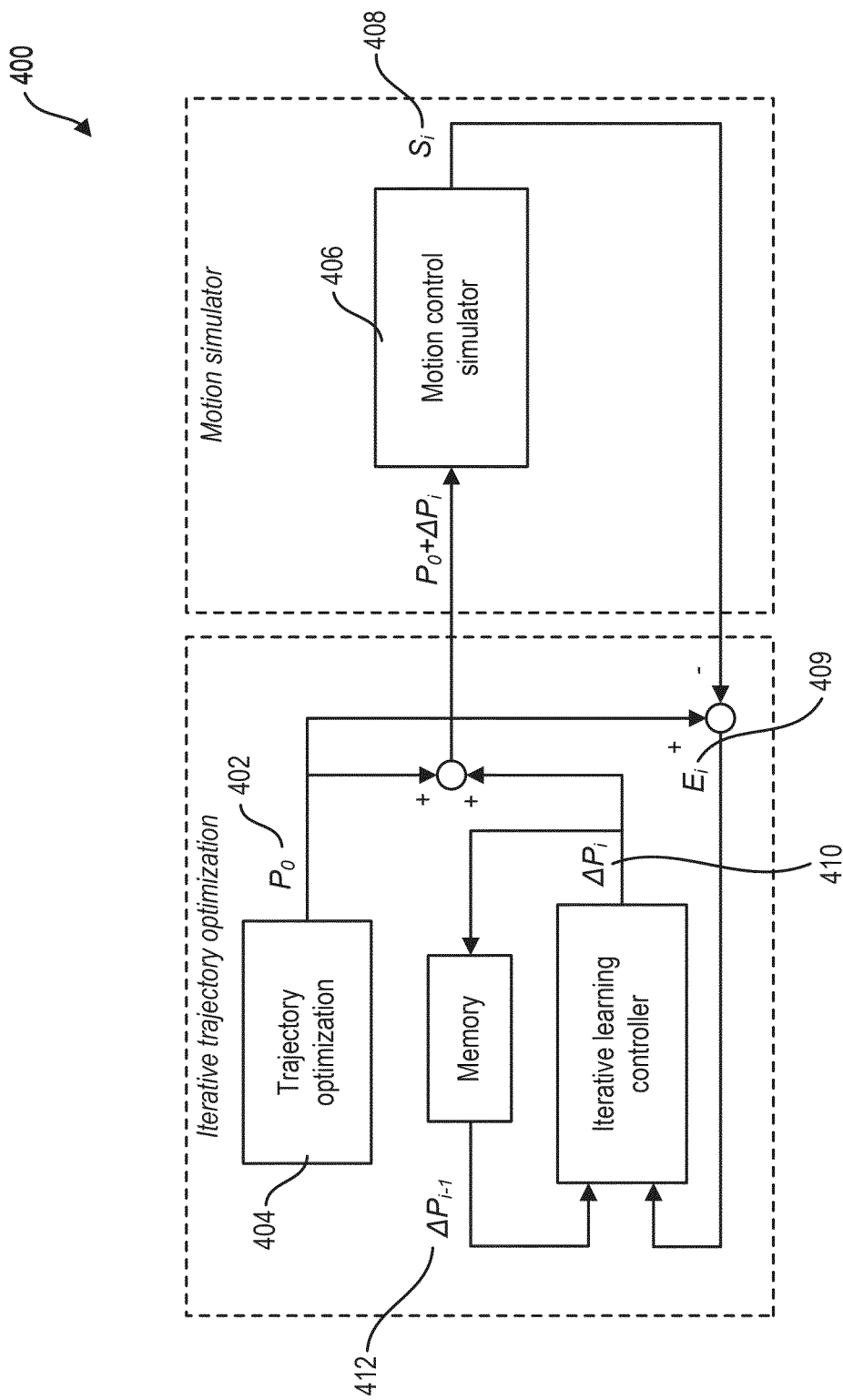
FIG. 4 shows a block diagram of iterative trajectory optimization and motion control simulator at the i-th iteration of the current disclosure.

FIG. 4 shows a block diagram 400 of iterative trajectory optimization and motion simulator at the i-th iteration. First, an initial motion trajectory $P_0$ 402 is generated from traditional trajectory optimization 404 and then sent to motion control simulator 406 (with initial offset $\Delta P_0 = 0$). The motion trajectory is made up of n trajectory waypoints $p_j$ (j=1, 2, ..., n), which includes the desired vehicle motion.

$$P_0 = \{p_0, p_1, \ldots, p_n\} \quad (11)$$

At the i-th iteration, motion control simulator 406 operates based on the vehicle dynamic model, vehicle operational constraints, and motion controller design in section II. The simulated motion trajectory $S_i$ 408 is obtained in the form of n simulated motion points $s_j$ (j=1, 2, ..., n) corresponding to each motion trajectory waypoint $\{p0, p1, \ldots, p_n\}i$.

$$S_i = \{s_0, s_1, \ldots, s_n\}_i \quad (12)$$

By comparing the difference between initial trajectory $P_0$ and simulated motion trajectory $S_i$, the tracking error 409 at the i-th iteration is obtained as:

$$E_i = P_0 - S_i = \{e_1, e_2, \ldots, e_n\}_i \quad (13)$$

Applying the idea of iterative learning control, a trajectory offset $\Delta P_i$ 410 can be derived as:

$$\Delta P_i = \Delta P_{i-1} + K_{ILC} E_i \quad (14)$$

where $\Delta P_{i-1}$ is the trajectory offset 412 of previous iteration, and $K_{ILC}$ is the iterative learning control gain matrix. Then the offset $\Delta P_i$ will be added to the initial trajectory for the simulation of the next iteration. This process will repeat until a termination condition in the simulation evaluation is met.

Figure 5:
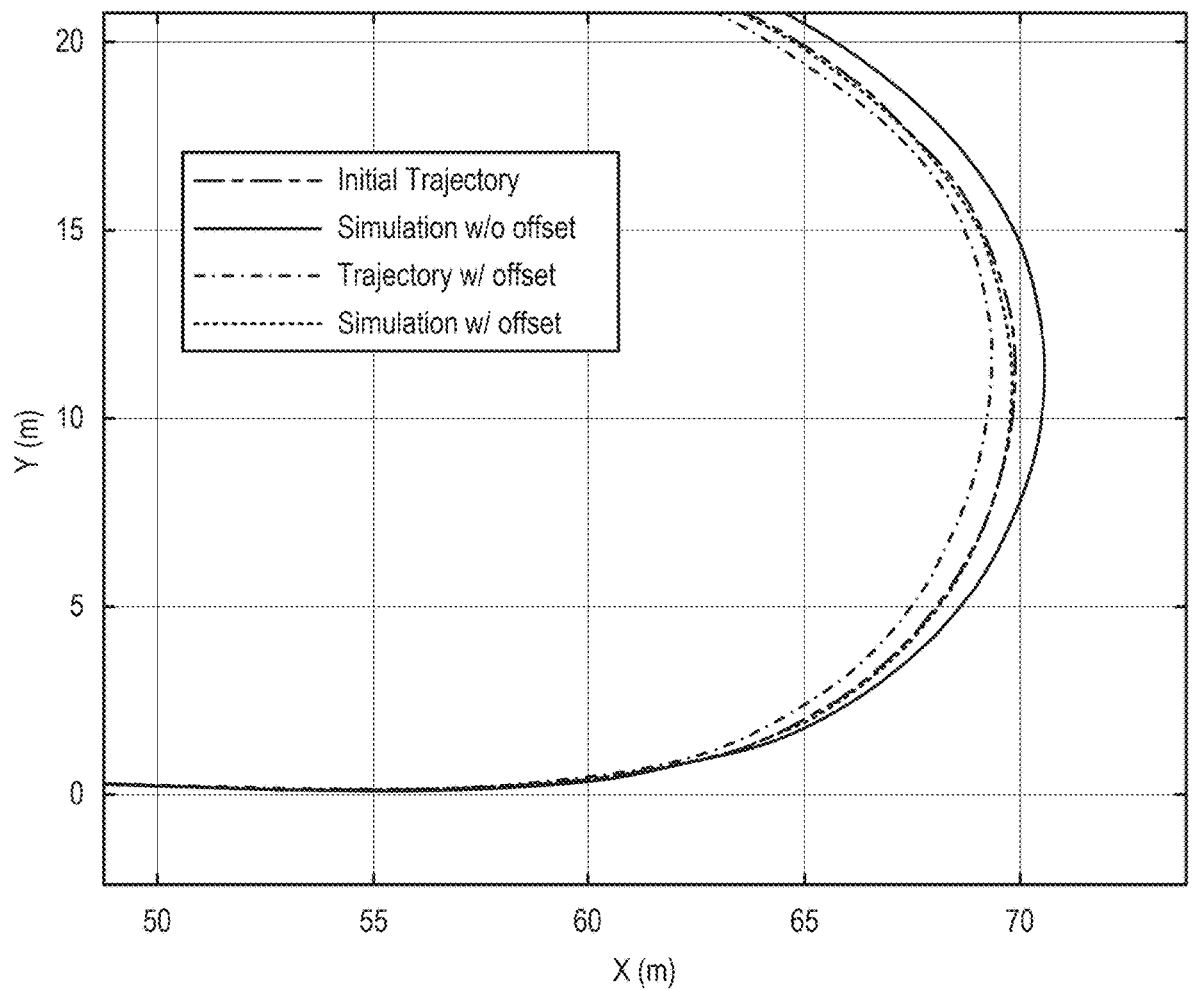
FIG. 5 shows an Illustration of iterative motion planning of the current disclosure.

FIG. 5 shows a comparison between motion planning with ITO and traditional motion planning. In the example, the initial trajectory is regarded as the reference trajectory. For the LQR motion controller in section II, the simulated trajectory has a certain deviation with the trajectory path. When applying the ITO, a trajectory with an offset is sent to the motion control operator instead of the initial trajectory and the simulation trajectory under the trajectory with offset is much closer to the initial trajectory compared with the traditional plan.

C. Terminating Condition and Trajectory Evaluation

The ITO module also needs to consider the terminating condition of the iteration simulation and the simulated trajectory evaluation.

Inside simulation evaluation, a iteration limit $i_{limit}$ and a terminating condition $$\sum_{k=1}^{n} (e_k^T W e_k) < \epsilon \quad (15)$$

are added for terminating the iterative simulation, where W is the weight matrix and e is the terminating threshold. When iterative simulation performance is close enough to the initial trajectory $P_0$ (when the condition (15) is met) or reaching the iteration limit $i_{limit}$, the iterative motion simulation finishes and the trajectory offset $\Delta P_i$ and the tracking error $E_i$ are sent back to motion planning as feedback information as shown in FIG. 3.

The final simulated trajectory, $P_0 + E_i$, is used to motion planning evaluation. If the simulated trajectory still meets the motion planning requirement, e.g. collision-free, it will be regarded as the desired motion trajectory, and an adjusted trajectory of (P0+$\Delta$Pi) will be sent to motion control operator to calculate the vehicle control maneuver. If the simulated trajectory does not meet the requirement, it will trigger a motion trajectory regeneration, and then repeats the iterative motion simulation process.

D. Real-Time Application Strategy

Figure 6:
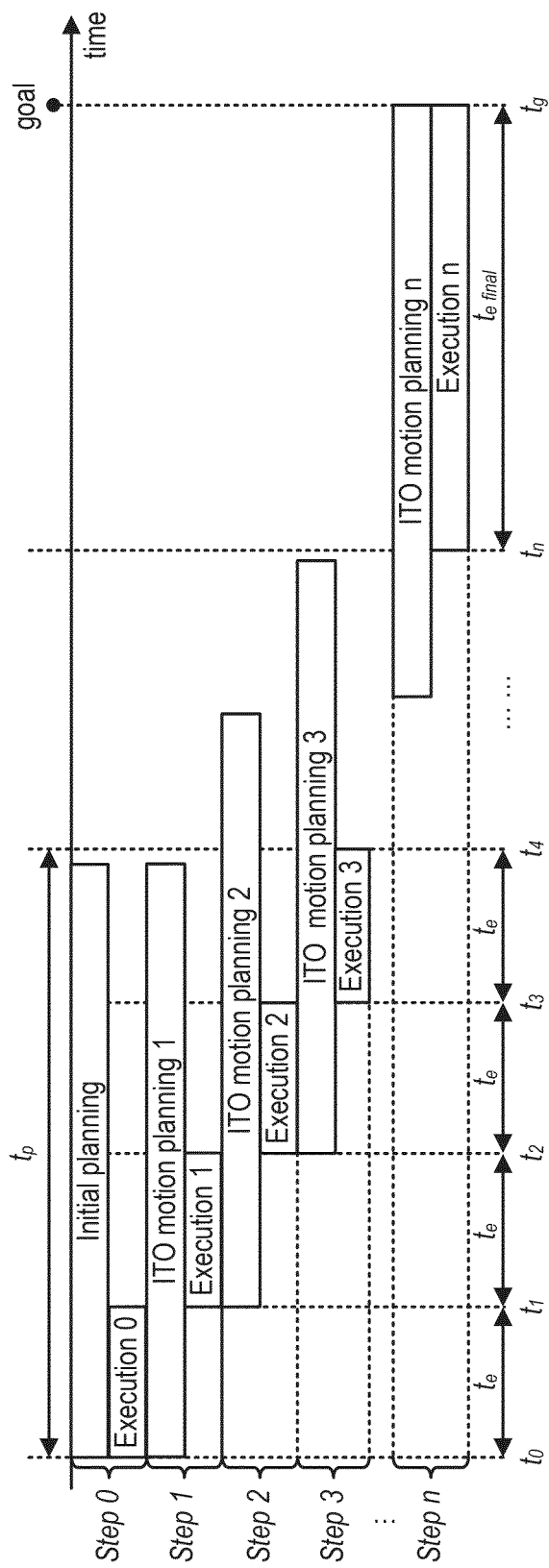
FIG. 6 shows the time interleaving of iterative motion planning and motion operator's execution for one embodiment of the current disclosure.

To apply the proposed ITO motion planning method to the real-time application, a concrete time interleaving of iterative motion planning and motion operator's execution is shown in FIG. 6. FIG. 6 shows the time interleaving of iterative motion planning and motion operator's execution. The overall process starts at time $t_0$ and finishes at time $t_g$ when the vehicle reaches the goal. The motion planning here generates a motion trajectory for a time horizon $t_p$, and motion control operator executes an motion planning trajectory for a time horizon $t_e$ ($t_e < t_p$).

For step 0, motion planning generates the initial planning for the motion control operator. At the same time, step 1 of ITO motion planning begins. The motion control simulation runs based on the initial vehicle position at time $t_0$, and get the ITO motion trajectory planning 1. If the simulated trajectory meets the mission and behavior planning requirement, the motion control operator will following an offset trajectory of the ITO motion planning 1 and execute for the next time length of $t_e$. If it does not meet the requirement, the motion planning will regenerate another motion planning and go over the above iterative motion planning again until finding an available motion trajectory. This process will repeat in the entire process until the motion planning time window reaches the time of $t_g$. For the last step, step n, the motion control operator executes the remaining motion trajectory until reaching the target.

The only requirement of this real-time application strategy is that the ITO motion planning process should be finished within the time length of te.

IV. Simulation Results

In this section, the iterative motion planning and controller strategy was tested under several test simulations. The optimization problem is solved in MATLAB on a Windows laptop with an Intel Core i5 CPU at 2.50 GHz in 43.65 milliseconds averaged over 150 tests.

A. The Parameter Setting

The motion planning and motion controller have different update frequency. The motion planning update frequency is 10 Hz, and the motion controller is 100 Hz in our tests. For each waypoint $_{pi}$ from motion planning, it contains the desired motion profile of X and Y, heading angle Ψ, trajectory curvature κ, velocity v.

$$p_i = [X, Y, \psi, \kappa, v]_i^T \quad (16)$$

For the ITO motion planning, the motion planning horizon $t_p$ is 5 s, and the motion controller execution horizon $t_e$ is 1 s. The iterative upper limit $i_{limit}$ is set as 20. The iterative learning control gain is set as:

$$K_{ILC} = [0.1, 0.1, 0.05, 0, 0.05] \quad (17)$$

B. Test 1: Winding Road

Figure 7:
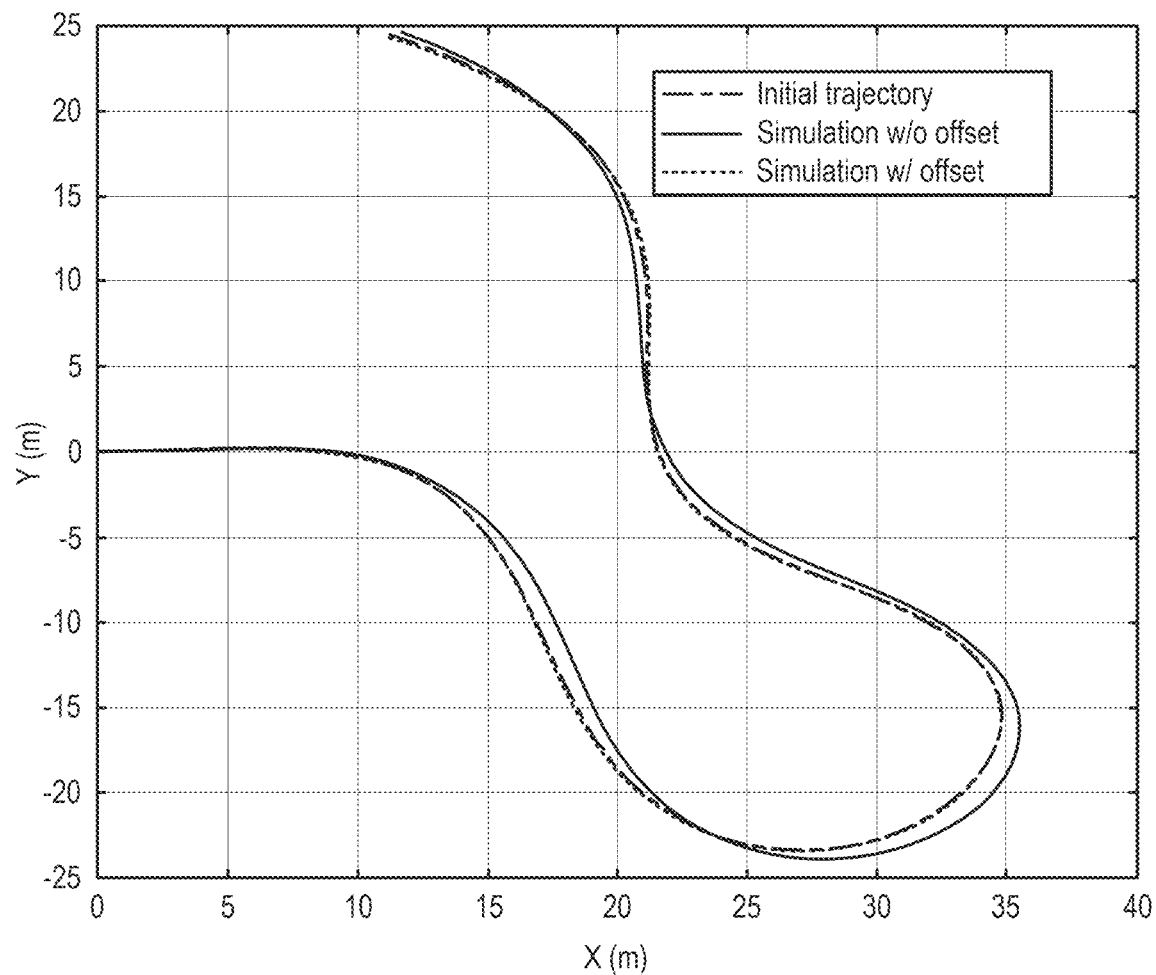
FIG. 7 shows Test 1, a motion trajectory and the simulations with and without the trajectory offset from ITO motion planning.

The first test is a motion trajectory on a winding road shown in FIG. 7. FIG. 7 shows Test 1, motion trajectory and the simulations with and without the trajectory offset from ITO motion planning. From the simulation comparison, the trajectory of the simulation with ITO motion planning feedback is almost overlapping with the initial motion planning trajectory. On the contrary, the simulation trajectory without trajectory offset has a large deviation away from the initial trajectory, especially on the curvy road part.

Figure 8:
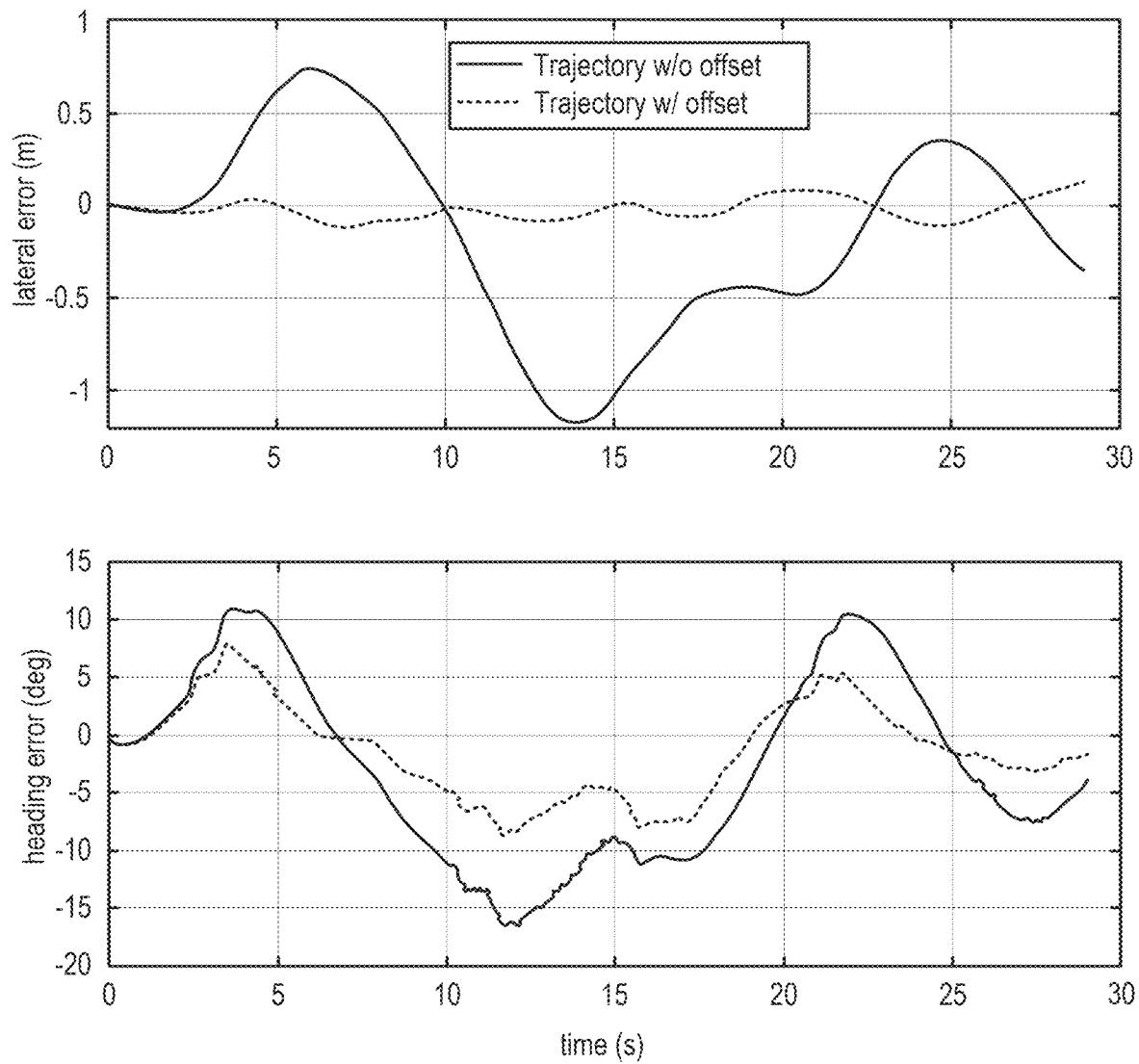
FIG. 8 shows Test 1 with lateral and heading errors of the motion simulation with and without the trajectory offset from iterative motion planning.

The comparisons in terms of lateral tracking error and heading error are shown in FIG. 8. FIG. 8 shows Test 1, lateral and heading errors of the motion simulation with and without the trajectory offset from iterative motion planning. The simulation with the ITO motion planning offset has a much smaller lateral error and heading error. The lateral tracking error is within 0.2 m along the whole trajectory, and the maximum heading error is about 8 degrees. On the contrary, the simulation under traditional motion planning and motion controller structure show a large tracking error of about 1.2 m the maximum lateral tracking error and 16 degrees the maximum heading error.

Figure 10:
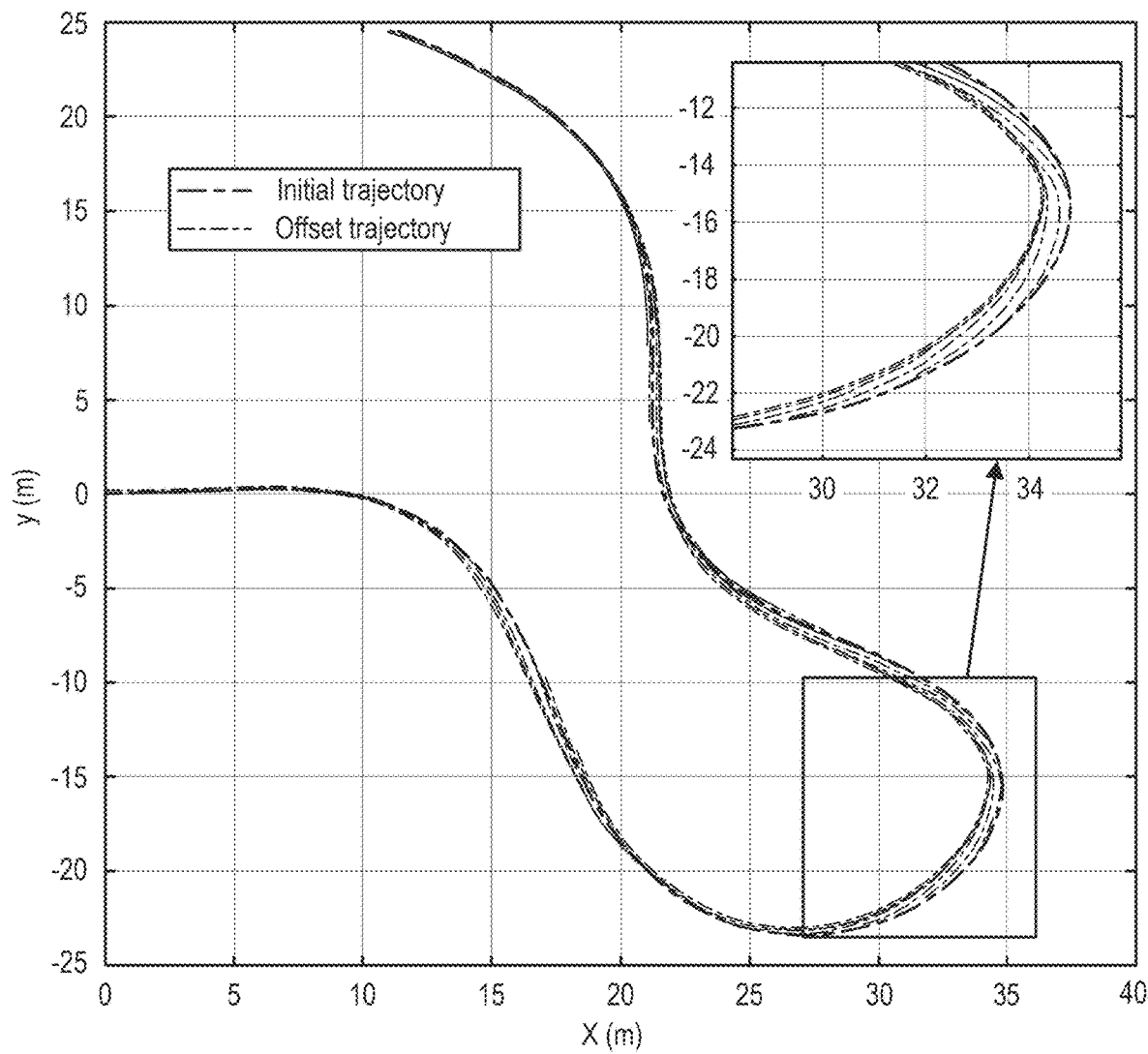
FIG. 10 shows Test 1 with initial trajectory from motion planning and trajectory with offset to motion control operator.

When the motion control simulator gets a certain deviation away from the initial trajectory, the iterative learning controller will add a trajectory offset for the simulator until it gets a satisfied tracking performance or reach the iteration limit. FIG. 10 shows how the motion trajectory offset affects the motion controller. From FIG. 10, the motion control simulator detects a tracking deviation on the winding road part, and then it sends the offset back to motion planning. After doing this process repeatedly, the trajectory offset will converge a certain value. At last, the motion planning sends the motion trajectory with offset, the green dashed line in FIG. 10, to the motion control operator. The operator executes only the first part to of the offset trajectory, and then repeats this process for the following trajectory.

C. Test 2: Elbow Curve Road

Figure 11:
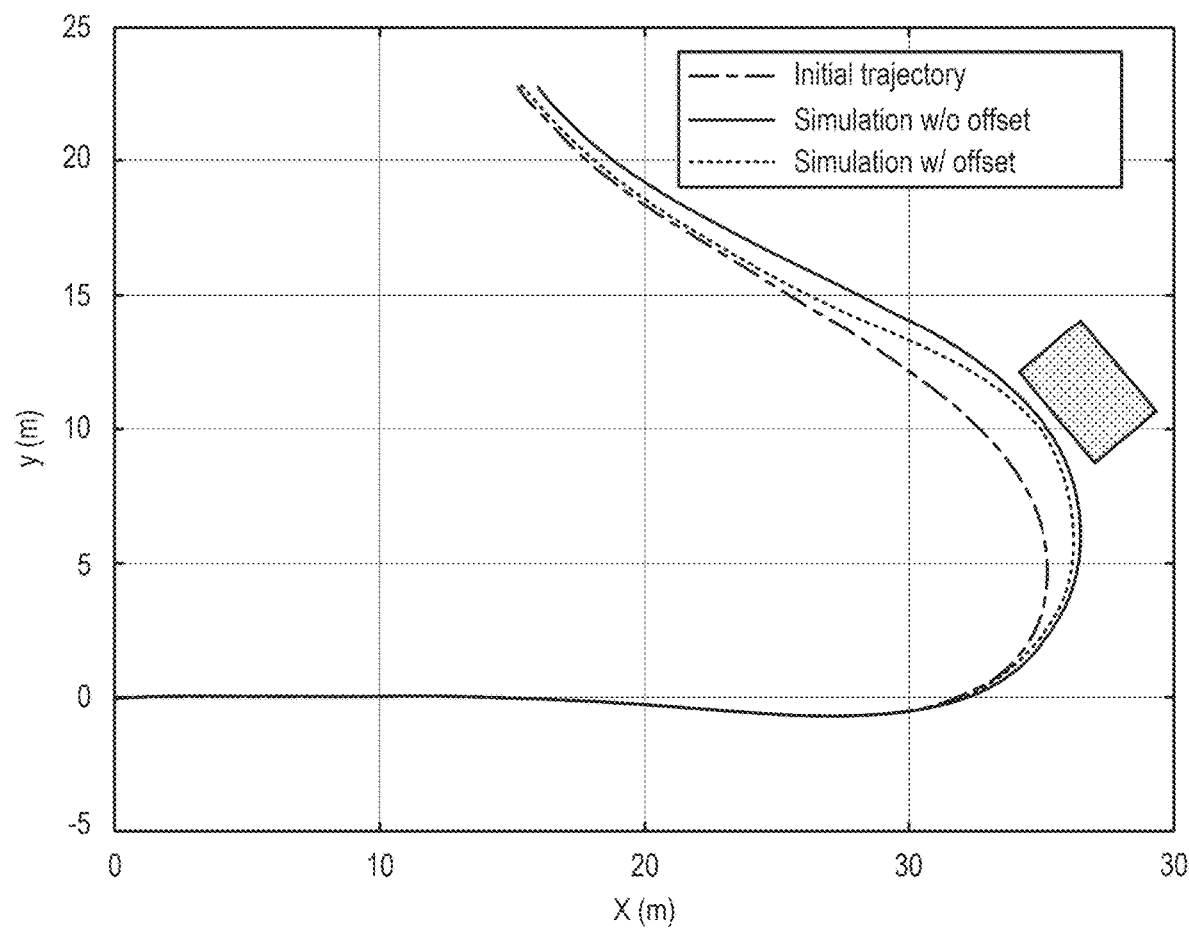
FIG. 11 shows Test 2 motion trajectory and the simulation with and without the trajectory offset from the ITO motion planning (rectangle represents a static obstacle).

The second test is a motion trajectory under an elbow curve road. FIG. 11 shows the simulation comparison between the motion control simulation with and without trajectory offset. From the result, the simulation trajectory with offset shows a certain improvement comparing the one without offset, but it still has a high possibility of a collision with another static obstacle which is a green box in FIG. 11. The main reason for this possible collision is because of physical and operational unfeasible motion trajectory (too quick velocity profile before entering the elbow curve road). The motion simulator in the case is able to show an early warning function. In this case, the motion control simulator predicts the possible collision, and the motion planning will update the motion trajectory based on the simulator feedback.

D. Numerical Result Comparison

The numerical result comparison lists on Table I, see FIG. 9, in terms of lateral tracking error and heading error between traditional motion planning and the proposed ITO motion planning. The comparisons are for three (3) typical driving scenarios: winding road, single-lane change, and double-lane change. The numbers listed are the root-mean-square error in meter or degree.

From the comparison, the vehicle tracking performance of the proposed motion planning shows a significant improvement than the traditional one. For the winding road, the proposed method has only 0.0758 m lateral error and 3.6358 degrees heading angle error, comparison with the 0.4627 m and 7.2801 degree of traditional motion planning, which is 83.8% and 50.1% improvement, respectively. For the other two scenarios, the proposed method also shows 43.9% and 51.9% improvement on lateral tracking and 26.5% and 20.3% improvement in heading angle tracking.

V. Conclusions

With respect to the current disclosure, iterative trajectory optimization is proposed for real-time motion planner. The proposed method provides a feedback connection from the motion controller to the motion planner, and it brings about three benefits for the motion planner and motion controller. First, the iterative learning controller updates a motion trajectory offset by accumulating the motion control simulator tracking error. By adjusting a trajectory offset iteratively, the motion controller performance gets significant improvement on trajectory tracking. Second, taking advantage of vehicle dynamic based control algorithm, the motion planner is able to generate a physical and operational feasible trajectory. At last, a vehicle control simulate executes before the trajectory is sent to the motion control operator. The motion planner can predict the vehicle response, have enough time to do a replan if the vehicle cannot follow the trajectory well enough. Iterative trajectory optimization is also a model-based method. The planning and control precision depends on model accuracy.

In a further embodiment, an autonomous driving system (ADS), motion planning module generates a motion trajectory for a motion controller. Motion controller module tries to follow the motion trajectory as close as possible. Although a lot of advanced control methods, e.g. linear quadratic regulator (LQR), model predictive control (MPC), are applied to improve the tracking performance, it still cannot guarantee an accurate tracking performance. The signal communication between normal motion planning and motion controller is an open-loop process, where no feedback sends back to motion planning module.

For the current disclosure, an iterative feedback motion planning is proposed to achieve a more accurate motion tracking based on the idea of iterative feedback control. In this method, the motion controller module is separated into two sub-modules, motion control simulator and motion control operator. The generated motion trajectory in the form of a set of trajectory waypoints first send from motion planning to motion control simulator. The motion control simulator estimates the vehicle simulated trajectory, and then calculates the tracking error. The tracking error as the feedback signals sends back to motion planning. After that, the motion planning adjusts its motion trajectory waypoints by adding a set of offset signals which is related with the feedback tracking error signal. After several iterations of adjustments, if the performance meets the termination condition (the tracking performance error is smaller than the threshold, or the iteration reaches the maximum iteration), this adjusted motion trajectory will be sent to motion control operator for physical vehicle to operate.

Figure 12:
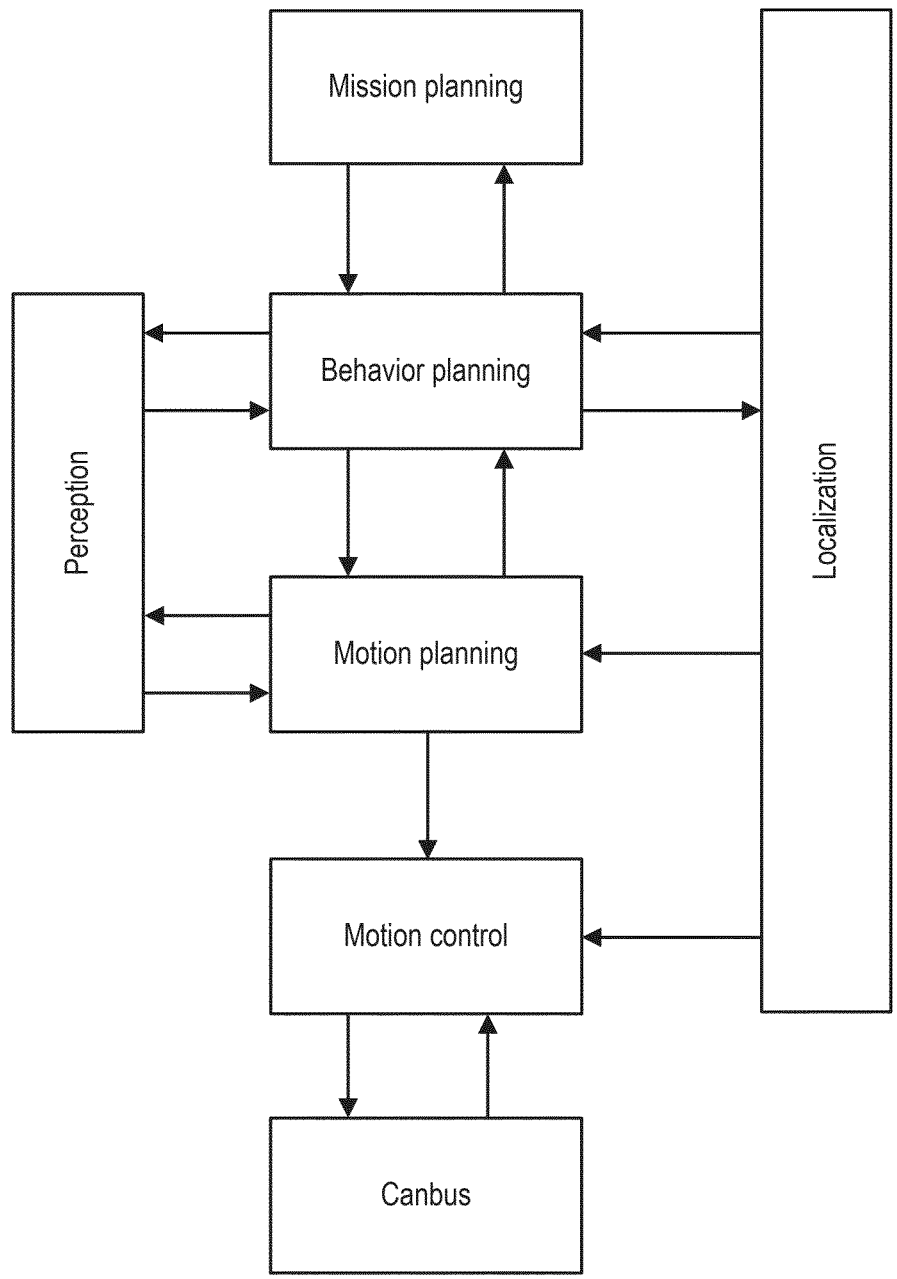
FIG. 12 shows the normal structure of ADS motion planning and control system.

FIG. 12 shows the normal structure of ADS motion planning and control system. The mission planning aims to find an efficient and low-time-consuming route along road network from the starting location to the destination location; the behavior planning aims to utilize perception information to predict future intent and motion of other traffic participants and identify appropriate driving goals (spatial and temporal) incorporating strategic (e.g. routing), tactical (e.g. perception), and vehicle state (e.g. localization) information; the motion planning aims to compute an efficient, safe, comfortable, and dynamically feasible trajectory for ADS to operate; the motion controller aims to drive the vehicle along the generated trajectory from motion planning safely and stably with little motion error and small delay time. The mission planning, behavior planning, motion planning, and vehicle controller receive the information from perception and localization and provide some feedback information in some special case. To be noticed, the signal communication between motion planning and motion control is in open loop.

Figure 13:
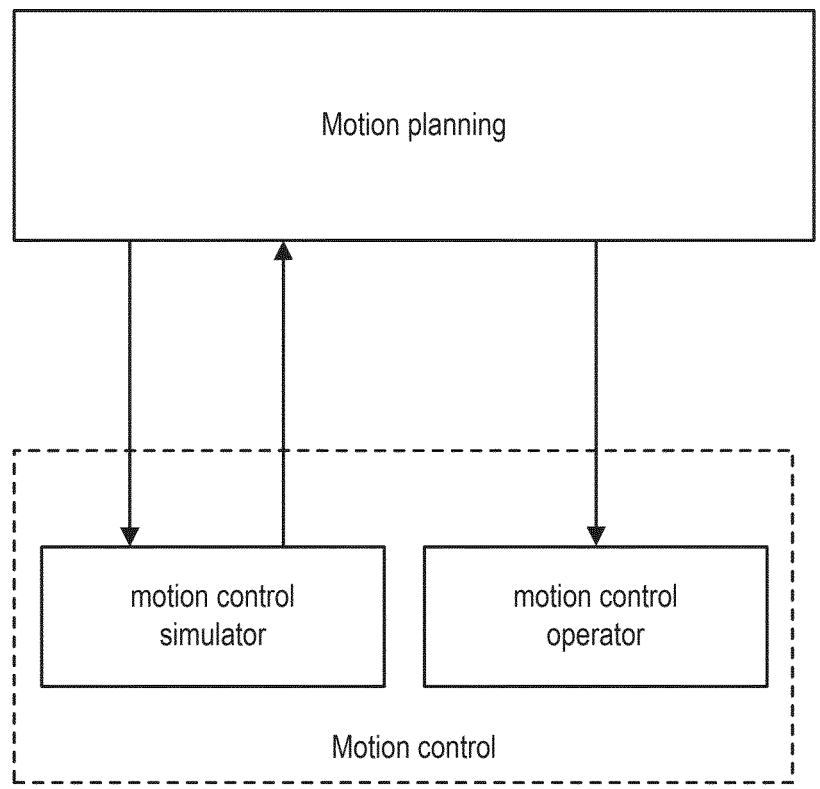
FIG. 13 shows a proposed structure of ADS motion planning and control system.

FIG. 13 shows the proposed structure of ADS motion planning and control system. The motion controller module is separated into two parts, motion control simulator and motion control operator. The motion control simulator is to estimate the motion trajectory based on motion planning trajectory and control method. The tracking error between motion simulated trajectory of motion control simulator and motion trajectory from motion planning sends back to motion planning as feedback signal. When the motion control operator receives the final motion trajectory, it calculates the control maneuver and sends it to the CANbus of the vehicle.

FIG. 14 shows an example of the proposed iterative feedback motion planning. In FIG. 14 at (a), the motion planning generates an initial motion trajectory in terms of a set of trajectory waypoints $TW_{0,1 \sim n}$ with a fixed time interval. For each waypoint $TW_{0,i}$, it contains the desired motion information, but not limited to, the coordination X, Y, heading angle $\Psi$, linear velocity v, acceleration a, curvature K $$TW = [X, Y, \psi, v, a, K]^T$$

In FIG. 14 at (b), the motion control simulator estimates the vehicle simulated trajectory by following these trajectory waypoints.

In FIG. 14 at (c), the simulated waypoints $SW_{0,i}$ is selected from the simulated trajectory which is corresponding to each waypoints $TW_{0,i}$. The tracking error is defined as:

$$E_{0,i} = (TW_{0,i} - TW_{0,i})$$

In FIG. 14 at (d), the tracking error is sent back to motion planning as feedback signal. The adjusted motion trajectory waypoints are obtained by applying:

$$TW_{(j+1),n} = TW_{j,n} + KE_{j,n}$$

where K is the matrix of learning gains with the form of $K = \text{diag}(k_1, k_2, \ldots, k_n)$, $k_i$ is corresponding to each element of TW. Based on the application of the adjusted waypoints $TW_{1,1 \sim n}$, the updated simulated trajectory and simulated waypoints $SW_{1,1 \sim n}$ are obtained from motion control simulator.

In FIG. 14 at (e), this adjusting process runs for several iterations until a satisfied simulation performance is obtained when $$E_j^T Q E_j < \varepsilon$$

where the weight matrix Q is positive definitive matrix, or reaches the maximum number in of iteration. Then the final adjusted motion trajectory $TW_{j,1 \sim n}$ is sent to motion control operator.

Figure 15:
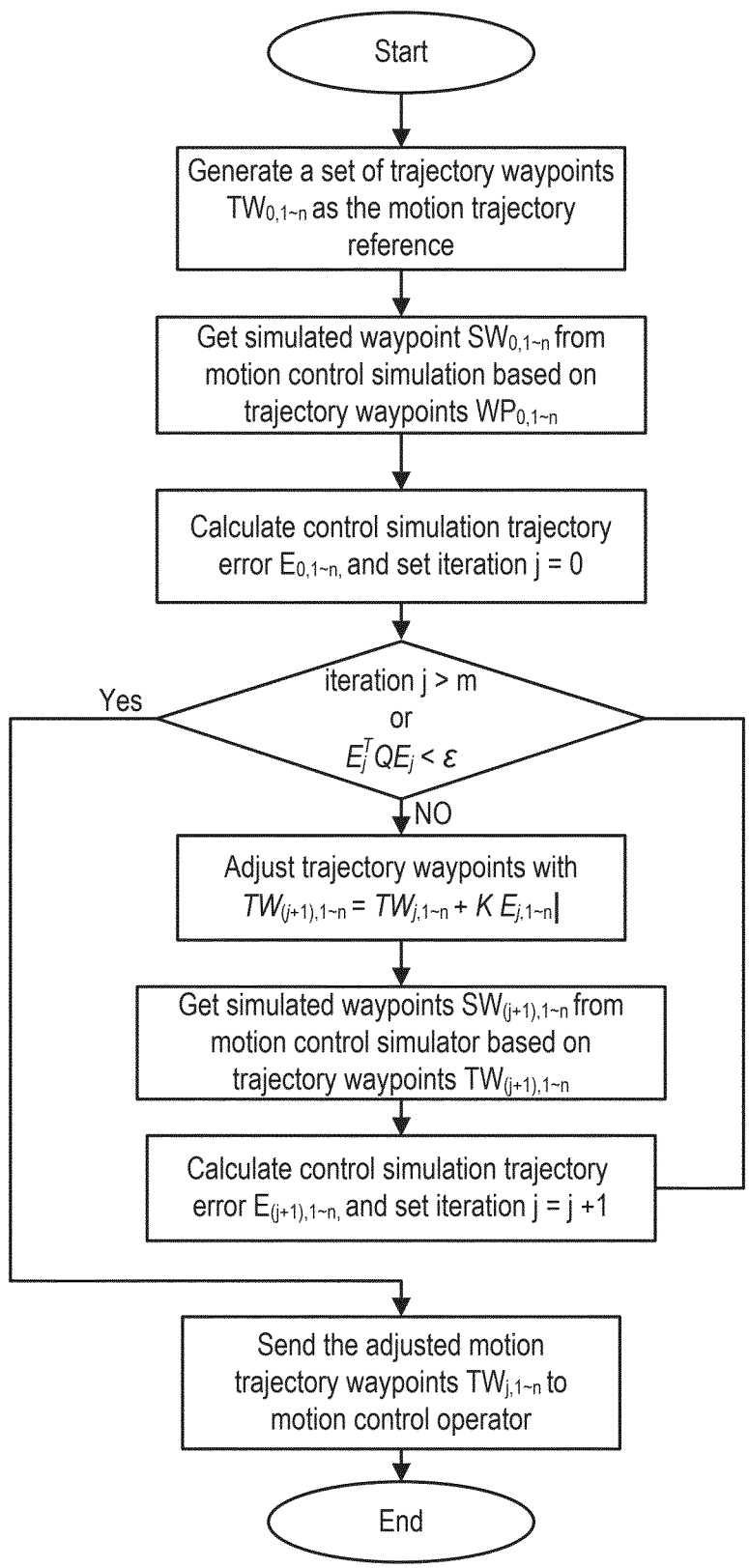
FIG. 15 is a diagram of an example of the method for iterative feedback motion planning.

FIG. 15 is a diagram of an example of the method for iterative feedback motion planning. Motion planning generates a set of initial trajectory waypoints $TW_{0,1 \sim n}$ as the motion trajectory reference. These waypoints are sent to motion control simulator, and the motion control simulator gets the related simulated waypoints $SW_{0,1 \sim n}$. Then tracking error is obtained by comparing the difference of the trajectory waypoints and the simulated waypoints. Then comparing whether the error is small enough by meeting the criterion $E_j^T Q E_j < \varepsilon$. If the simulation tracking performance does not meet the requirement or the iteration does not reaches the maximum number in of iteration, the adjusted motion trajectory is then calculated by applying $TW_{(j+1),1 \sim n} = TW_{j,1 \sim n} + KE_{j,1 \sim n}$. A new simulated waypoints and tracking error from motion control simulator are obtained by applying the adjusted motion trajectory waypoints. This the motion trajectory adjustment operates iteratively. When the tracking error is small enough in the termination condition or iteration is larger than the iteration limit, the adjusted motion planning trajectory will be sent to motion control operator to calculate the control maneuver for physical vehicle.

LUT-Based LQR Controller for Lateral Dynamics

In a further embodiment, when the vehicle is moving, the longitudinal velocity $\dot{x}$ of the vehicle is changing, which makes the lateral dynamic (6) time-varying. To apply LQR control design, the lateral controller needs to update the control feedback gain K every cycle. This process is computational consuming especially for the motion controller with high update frequency.

To effectively derive the optimal lateral feedback gain for the varying longitudinal velocity $\dot{x}$, the LUT method is applied to accelerate the computation process. A set of LQR feedback gains are acquired offline for different longitudinal velocities with a fixed interval. For the current disclosure, the interval may be 1 mile per hour (0.447 meter per second), starting from 1 to 80 mile per hour. For each LQR design, it needs to meet the system stability requirement on phase margin and gain margin. The phase margin is at least 60 degree and gain margin is at least 5 dB. When applying the LUT-based LQR controller, the feedback gain is chosen as one with the closest longitudinal velocity from the LUT.

Robustness Analysis of Controller

When designing the motion controller, it is based on a set of specific vehicle parameters However, the controller design also suffers from the vehicle modeling uncertainty.

For example, the total mass in changes for different number of passengers, the CG position is varying for different weight of cargo in the trunk, longitudinal velocity $\dot{x}$ has certain measurement error, etc.

To evaluate the influence of these modeling uncertainties, the Monte Carlo method is implemented to test the system stability with five uncertain parameters in the lateral dynamic (6):

Longitudinal velocity: $\tilde{\dot{x}} = \dot{x} \times (0.9 \sim 1.1)$;

CG position: $\tilde{l}_f = l_f + (-0.05 \sim 0.05)l$

The tire corning stiffness (front): $\tilde{c}_f = c_f \times \tilde{c}_{ratio} \times (1 + \tilde{c}_{diff})$, where $\tilde{c}_{ratio}$ has the range from 0.7 to 1.3 and $\tilde{c}_{diff}$ has the range from $-0.05$ to $0.05$;

The tire corning stiffness (rear): $\tilde{c}_r = c_r \times \tilde{c}_{ratio} \times (1 - \tilde{c}_{diff})$ The total mass: $\tilde{m} = m + (-200 \sim 200)$ where $\dot{x}$, $l_f$, $c_f$, $c_r$, and m represent the values in specification, $l = l_f + l_r$ is the distance from front wheel to rear wheel, the variables with '~' represent uncertain variables, and $\tilde{c}_{ratio}$ and $\tilde{c}_{diff}$ represent the road friction condition and tire wear difference, respectively.

The total sampling condition are 10,000 for five random parameters with the given range. The evaluation is still based on the stability phase margin (Pm) and gain margin (Gm):

for the condition with Pm>50 degree and Gm>4 dB, it is marked as stable with blue color;

for the condition with Pm>0 degree and Gm>0, dB, it is marked as critical stable with magenta color;

for the condition with Pm<0 degree or Gm<0 dB, it is marked as unstable with red color.

Figure 16:
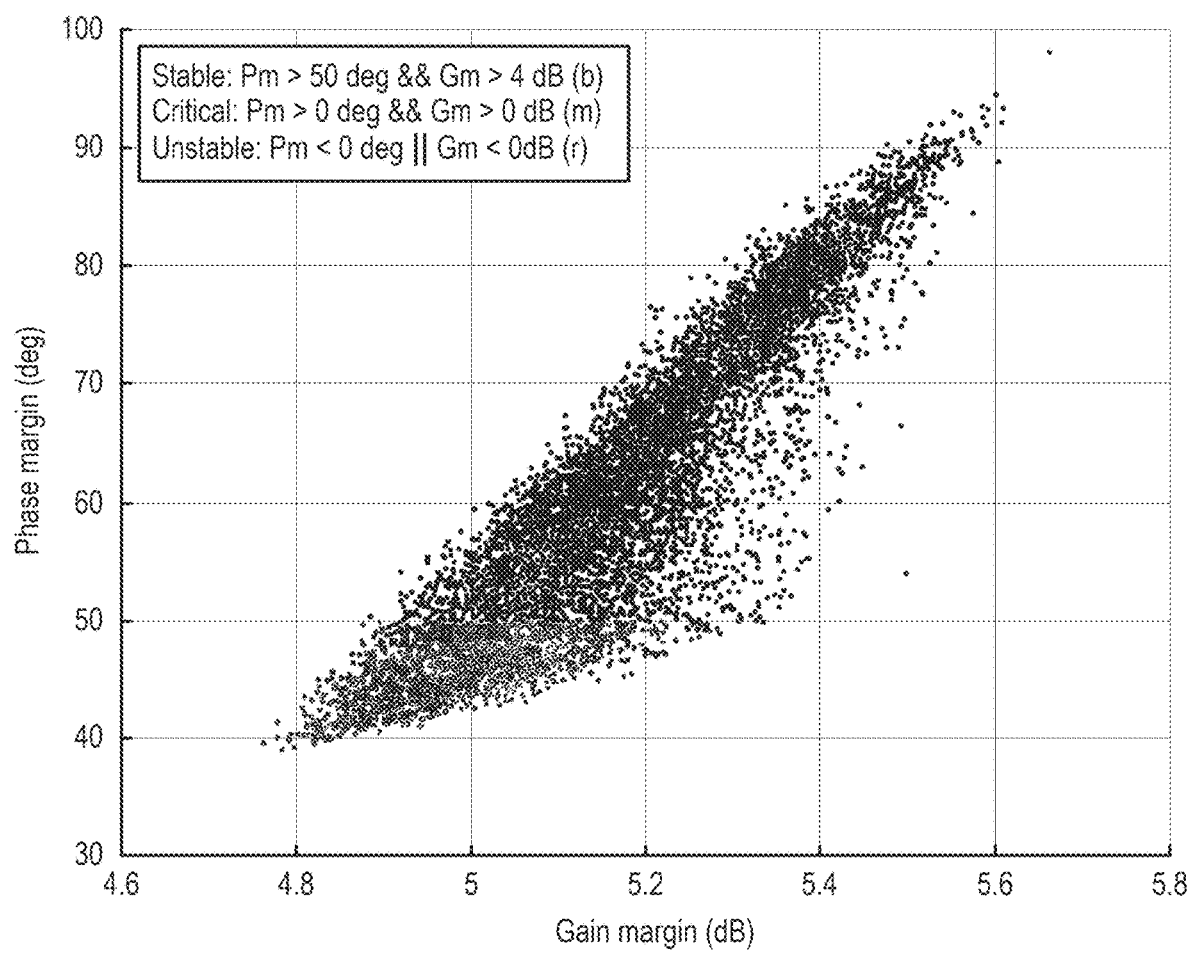
FIG. 16 is a graph showing Pm and Gm distribution of 10,000 random samples at 20 mph.
Figure 17:
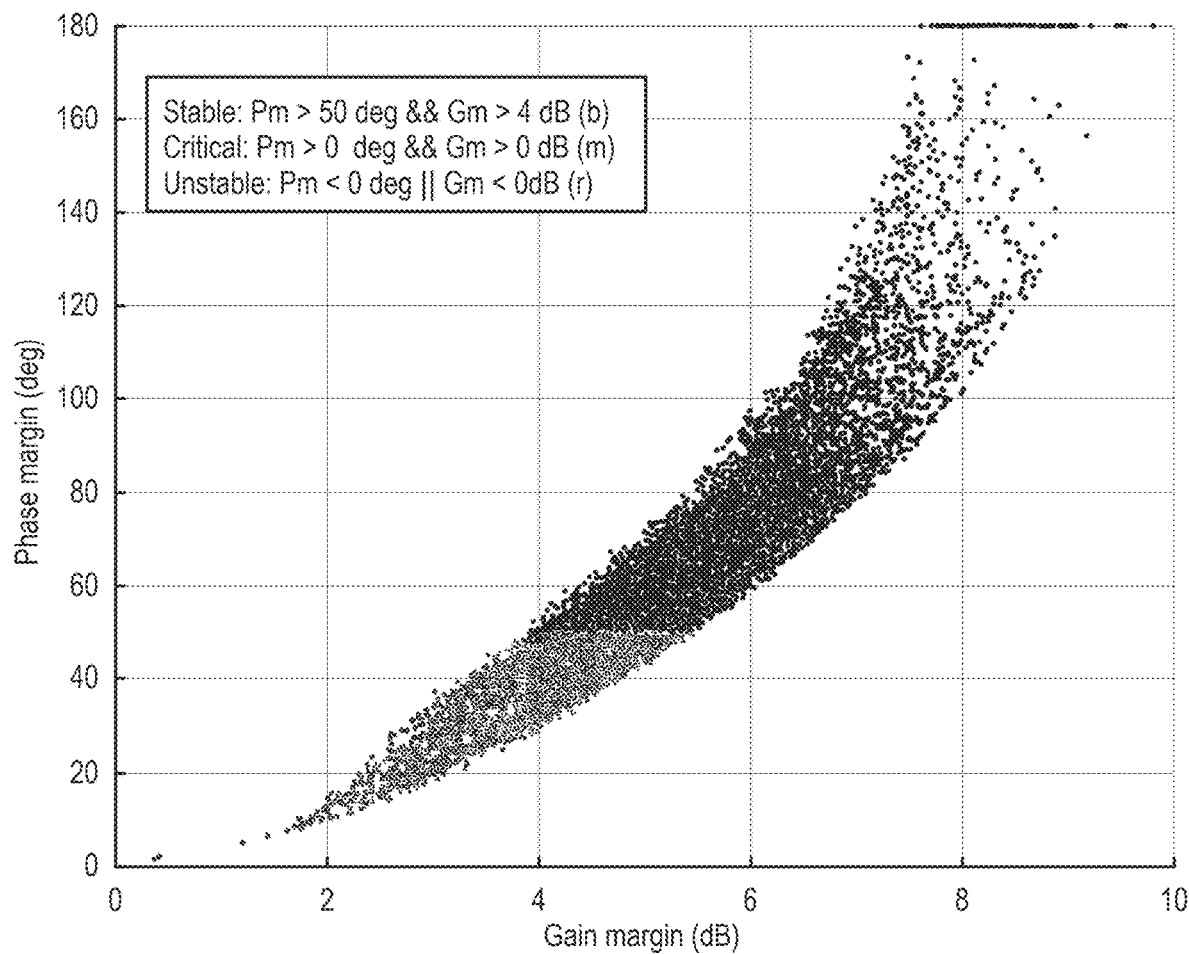
FIG. 17 is a graph showing Pm and Gin distribution of 10,000 random samples at 60 mph.

For the current disclosure, two kinds of conditions, low speed ($\dot{x}$=20 mph) and high speed ($\dot{x}$=60 mph), are presented to show the robustness of the LQR controller. FIGS. 16 and 17 show the Pm and Gm distribution of 10,000 random samples at 20 and 60 mph. From the result, all random samples are able to keep in stable or critical stable conditions, and at high speed the distribution is more scattered and has more possibility close to the unstable limit.

Figure 18:
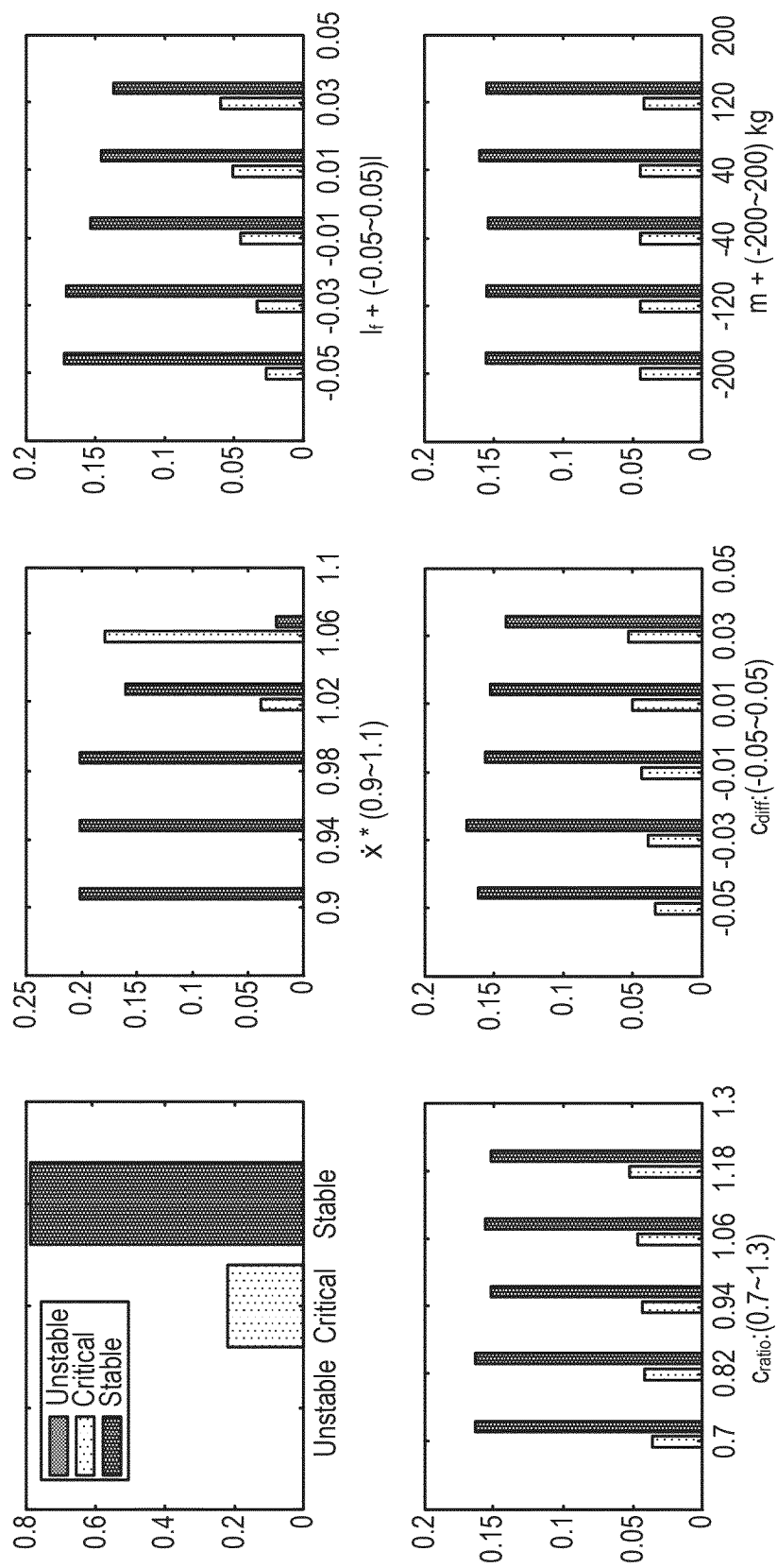
FIG. 18 shows tables of the stability statistics based on the five random parameters at 20 mph.
Figure 19:
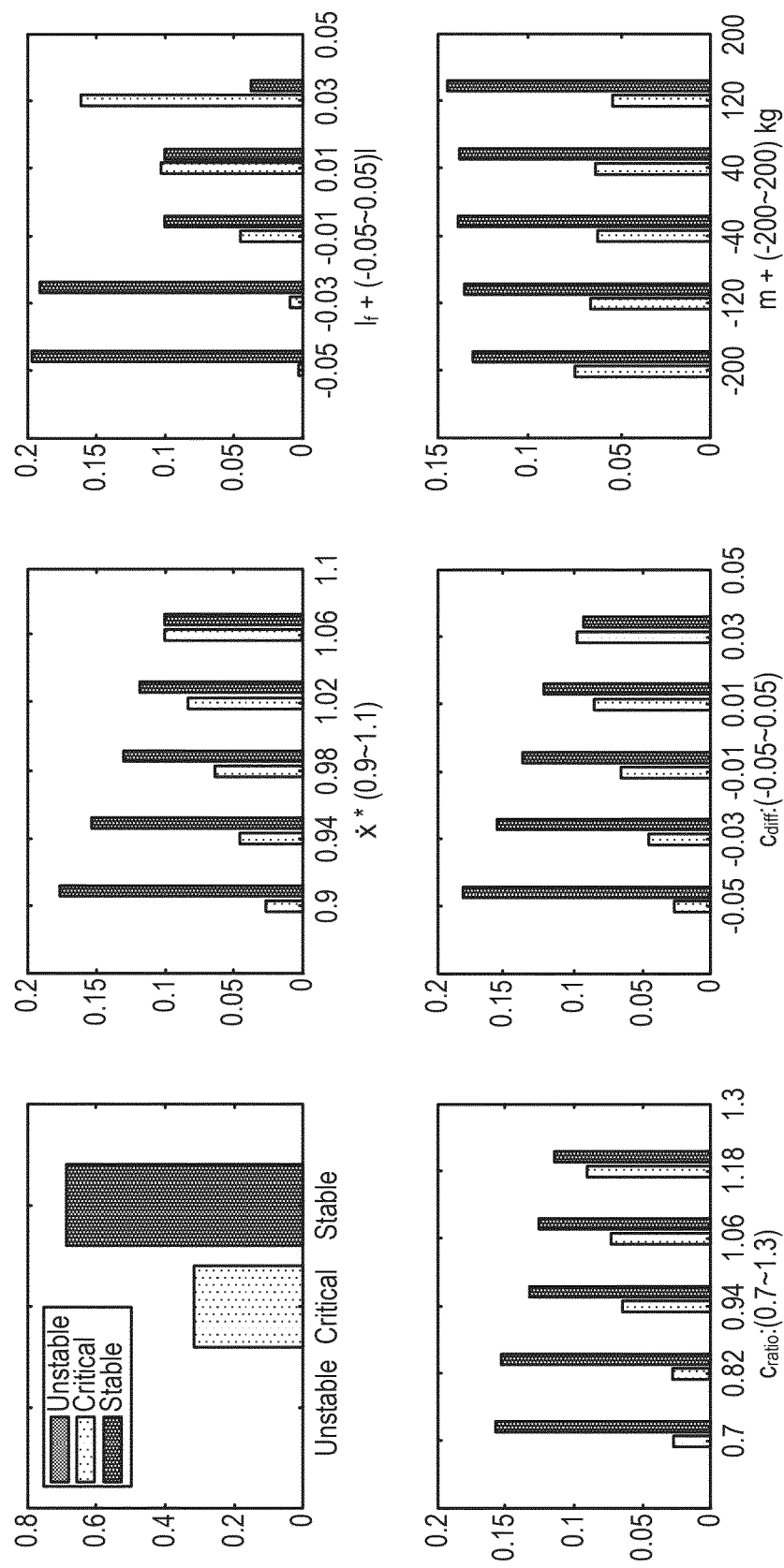
FIG. 19 shows tables of the stability statistics based on the five random parameters at 60 mph.

FIGS. 18 and 19 show the stability proportion distribution based on the five random parameters at low and high speed. These stability statistics are able to provide a guide on the parameter stability importance. When the proportion is evenly distributed, it means this parameter is not a critical one on the system stability. However, when the proportion is not evenly distributed and shows the increasing or decreasing trend, it means this parameter is significant on the system stability.

From the result of FIG. 18 at low speed, about 80% samples stay in the stable area, and the parameters of $\tilde{c}_{ratio}$, $\tilde{c}_{diff}$, and $\tilde{m}$ show certain evenly distribution, which means those parameters are not critical ones for system stability at low speed. For the parameter of $\tilde{\dot{x}}$ and $\tilde{l}_f$, there are uneven distributions especially the one of $\tilde{\dot{x}}$. It means that longitudinal speed measurement error (when measurement is lower than the actual speed) and CG location's back shift will degrade the system stability.

For the result of high speed in FIG. 19, similar results can be observed. The difference is that the vehicle has higher possibility (about 35%) falling into the critical stability area. All parameters except the total mass $\tilde{m}$ show an obvious distribution trend. It means that the following conditions will degrade the system stability with importance order from high to low:

$\tilde{l}_f$ (CG location): when the CG location moves backwards, the system stability degrades severely;

$\tilde{\dot{x}}$ (Longitudinal velocity measurement error): when the longitudinal speed measurement is lower than the actual speed, it will also decrease the system stability $\tilde{c}_{diff}$ and $\tilde{c}_{ratio}$ (Tire wear difference, road friction condition): when the road has higher friction factor or the rear tire wears worse than the front tire, they will degrade the system stability in certain degree.

Iterative Optimization of Motion Controller

A. Motion Controller Structure

For a traditional motion planner and motion controller, a reference motion trajectory is sent to a motion controller from a motion planner based on the processes of trajectory generation and trajectory optimization.

For one embodiment, of the LQR motion controller design of the current disclosure, the tuning of weighting matrices Q and R in Eq. (8) is a tradeoff process between tracking precision and system stability. Increasing (decreasing) the tracking weight Q or decreasing (increasing) the input weight R will increase (decrease) the tracking precision and lower (improve) the system stability; while doing the opposite changes, it will improve the system stability and decrease the tracking precision.

Figure 20:
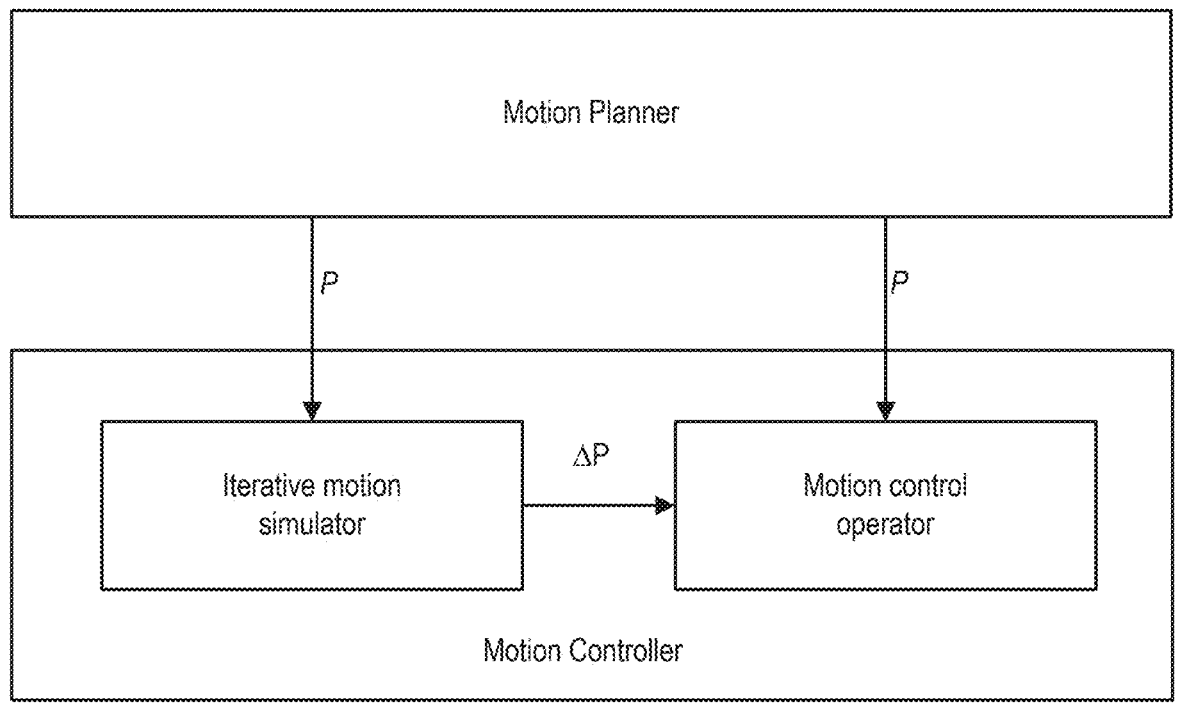
FIG. 20 shows one embodiment of a proposed structure of a motion controller with iterative optimization.

To improve the tracking precision while not degrading system stability, an iterative optimization approach is proposed as shown in FIG. 20. In the proposed structure, the motion controller is divided into two parts, iterative motion simulator and motion control operator. The reference motion trajectory P from motion planner is first sent to the iterative motion simulator to derive a trajectory offset ΔP. The simulation model is based on the model of Eqs. (1)-(3) without linearization and considering input constrains. After deriving the trajectory offset ΔP, the motion control operator will track the offset motion trajectory P+ΔP.

B. Iterative Optimization

Figure 21:
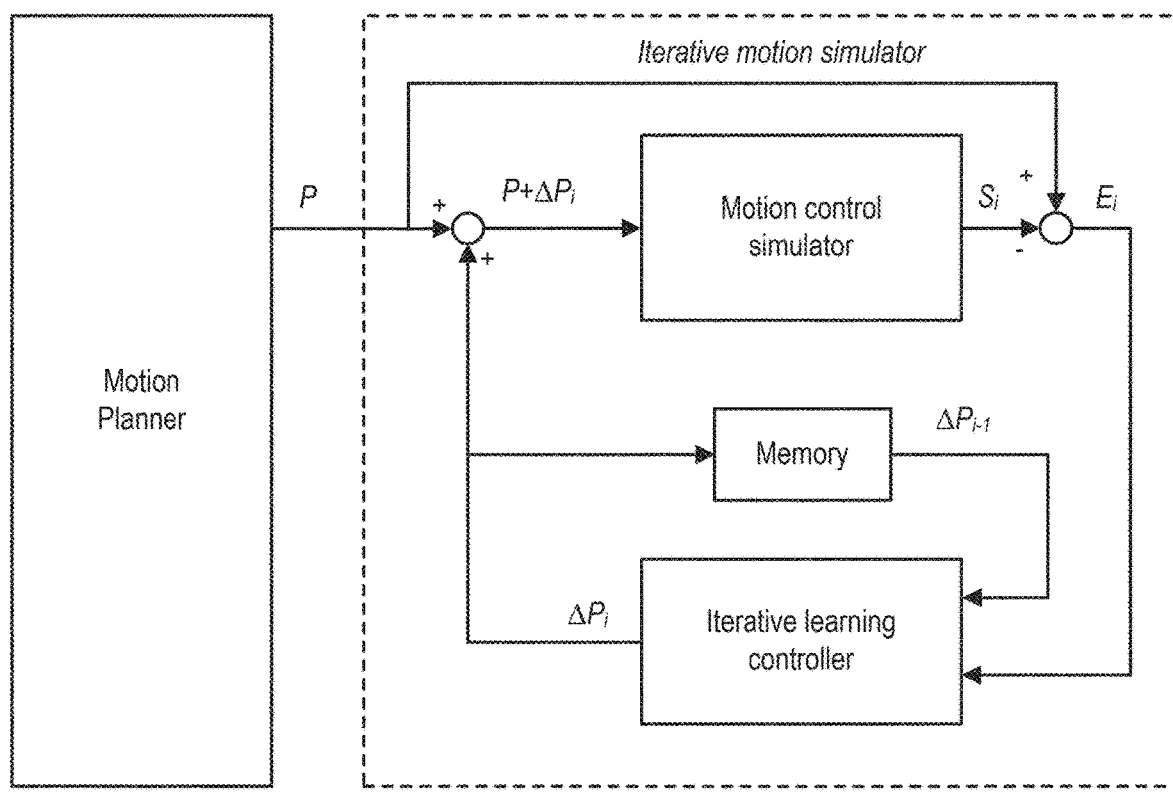
FIG. 21 shows a block diagram of an iterative motion simulator at the i-th iteration.

FIG. 21 shows the iterative optimization process in the iterative motion simulator at the i-th iteration (i=1, 2, 3, . . . , $i_{limit}$). The reference motion trajectory P is made up of n trajectory waypoints $p_j$ (j=1, 2, . . . , n), which contain the desired vehicle motion status:

$$P = \{p_0, p_1, \ldots, p_n\} \quad (11)$$

At the i-th iteration, the motion control simulator operates based on the vehicle dynamic model, vehicle operational constraints, and motion controller design as disclosed herein. The simulated motion trajectory $S_i$ is obtained in the form of n simulated motion points $s_j^i$ (j=1, 2, . . . , n) corresponding to each motion trajectory waypoint of P.

$$S_i = \{s_0^i, s_1^i, \ldots, s_n^i\} \quad (18)$$

By comparing the difference between reference trajectory P and simulated motion trajectory $S_i$, the tracking error at the i-th iteration is obtained as:

$$E_i = P - S_i = \{e_1^i, e_2^i, \ldots, e_n^i\} \quad (19)$$

Applying the idea of iterative learning control, a trajectory offset ΔPi can be derived as:

$$\Delta P_i = \Delta P_{i-1} + \Gamma E_i \quad (20)$$

Where ΔPi−1 is the trajectory offset of the previous iteration, and Γ is the iterative learning control gain matrix. Then the offset ΔPi in the current iteration will be added to the reference trajectory for the simulation of the next iteration. This process is repeated until a termination condition in simulation evaluation is met.

C. Termination Condition

The iterative optimization process also needs to consider the termination condition of the iteration simulation and the simulated trajectory evaluation.

An iteration limit $i_{limit}$ and a termination condition $$\sum_{k=1}^{n} (e_k^T W e_k) < \epsilon \quad (21)$$

are added for terminating the iterative simulation, where W is the weight matrix and ϵ is the terminating threshold. When iterative simulation performance is close enough to the reference motion trajectory P (when condition (21) is met) or reaching the iteration limit $i_{limit}$, the iterative optimization terminates. The trajectory offset $\Delta P_i$ is saved and sent to the motion control operator.

D. Motion Control Operator and Controller Stability Analysis

Figure 22:
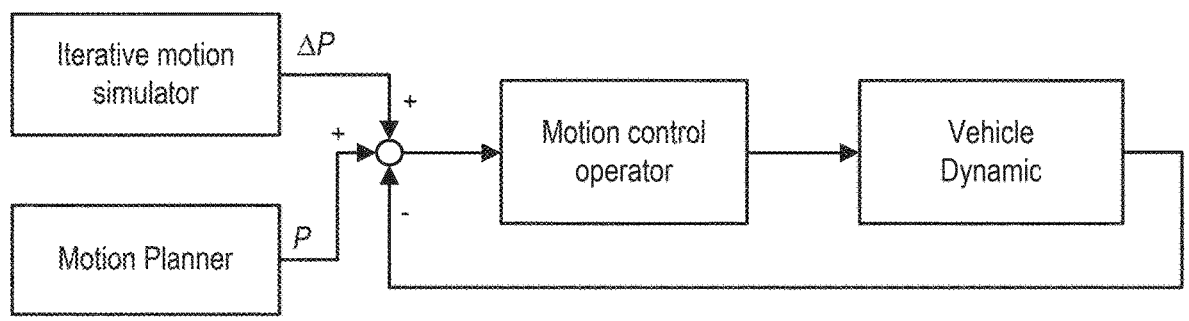
FIG. 22 shows one embodiment of a controller diagram of a motion control operator of the current disclosure.

FIG. 22 shows the control diagram of the motion control operator. For the motion control operator, the reference trajectory is the offset trajectory $P+\Delta P$ from both motion planner and iterative motion simulator. The output of the motion control operator is the control maneuver (steering angle, acceleration or deceleration) which then will be sent to vehicle CAN bus to operate.

The system stability only depends on the open-loop gain of the motion control operator and vehicle dynamics. Therefore the motion trajectory offset $\Delta P$ has no influence on the system stability and controller robustness. The adding of motion trajectory offset will improve the controller tracking performance.

Simulation Results

The current disclosure tested the proposed iterative motion planning and controller strategy under several simulation scenarios. The iterative optimization problem is solved in MATLAB on a Windows laptop with an Intel Core i5 CPU at 2.50 GHz in 43.65 milliseconds averaged over 150 tests.

A. Parameter Setting

The motion controller has an update frequency of 100 Hz in our tests. For each waypoint pi from motion planner, it contains the desired motion profile of X and Y heading angle $\Psi$, trajectory curvature $\kappa$, velocity v, and is described as:

$$p_i = [X_i, X_i, \Psi_i, \kappa_i, v_i]^T \quad (22)$$

The iterative upper limit $i_{limit}$ is set as 20. The iterative learning control gain is set as:

$$\Gamma = [0.1, 0.1, 0.05, 0.05, 0.1] \quad (23)$$

B. Winding Road
B. Winding Road

Figure 23:
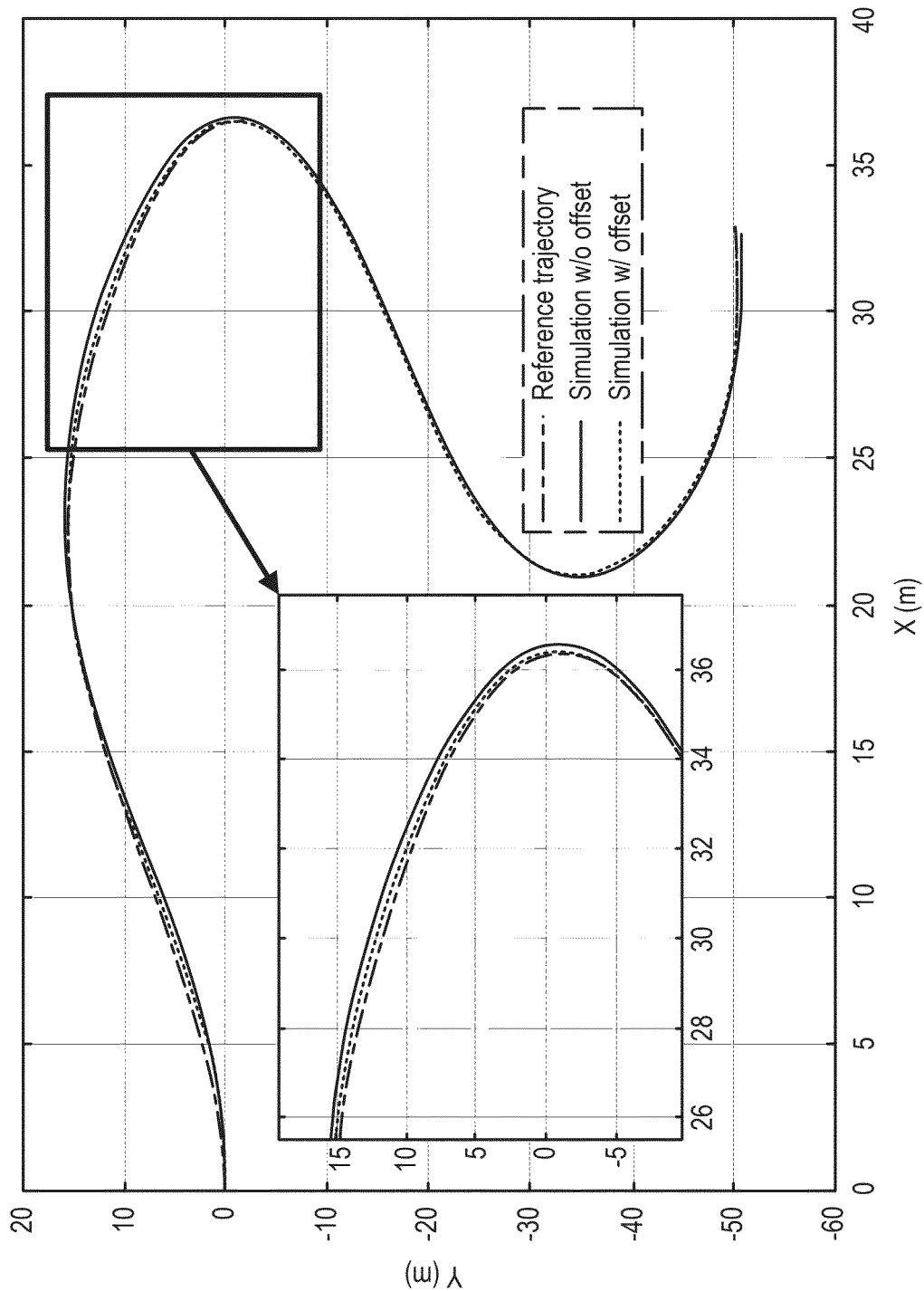
FIG. 23 shows on iteration of a winding road scenario: motion trajectory and the simulation with and without the trajectory offset.

FIG. 23 shows the tracking results of a winding road scenario. From the comparison, the trajectory of iterative optimization controller is almost overlapping with the reference motion trajectory. Conversely, the simulation trajectory without trajectory offset has a large deviation away from the reference trajectory especially on the curvy road section.

Figure 24:
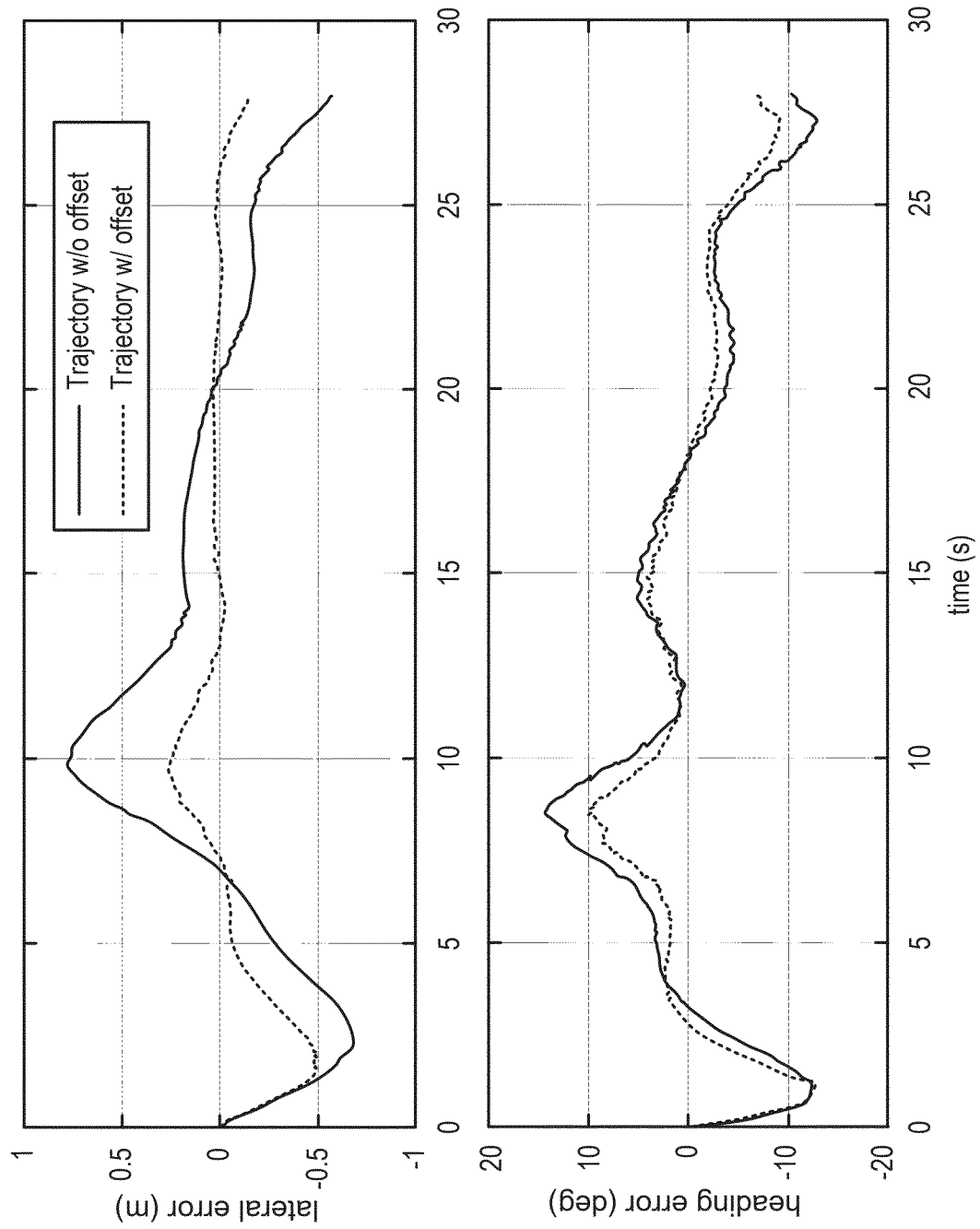
FIG. 24 shows a winding road scenario: lateral and heading errors of trajectory tracking with and without the trajectory offset

The comparisons in terms of lateral tracking error and heading error are shown in FIG. 24. The simulation with the motion trajectory offset has a much smaller lateral error and heading error. The lateral tracking error is within 0.3 m along the whole trajectory after the first second and the maximum heading error is about 10 degree. Conversely, the simulation under traditional motion planning and motion controller structure shows a large tracking error: about 0.8 m on the maximum lateral tracking error and 16 degrees on the maximum heading error.

C. Lane Change

Figure 25:
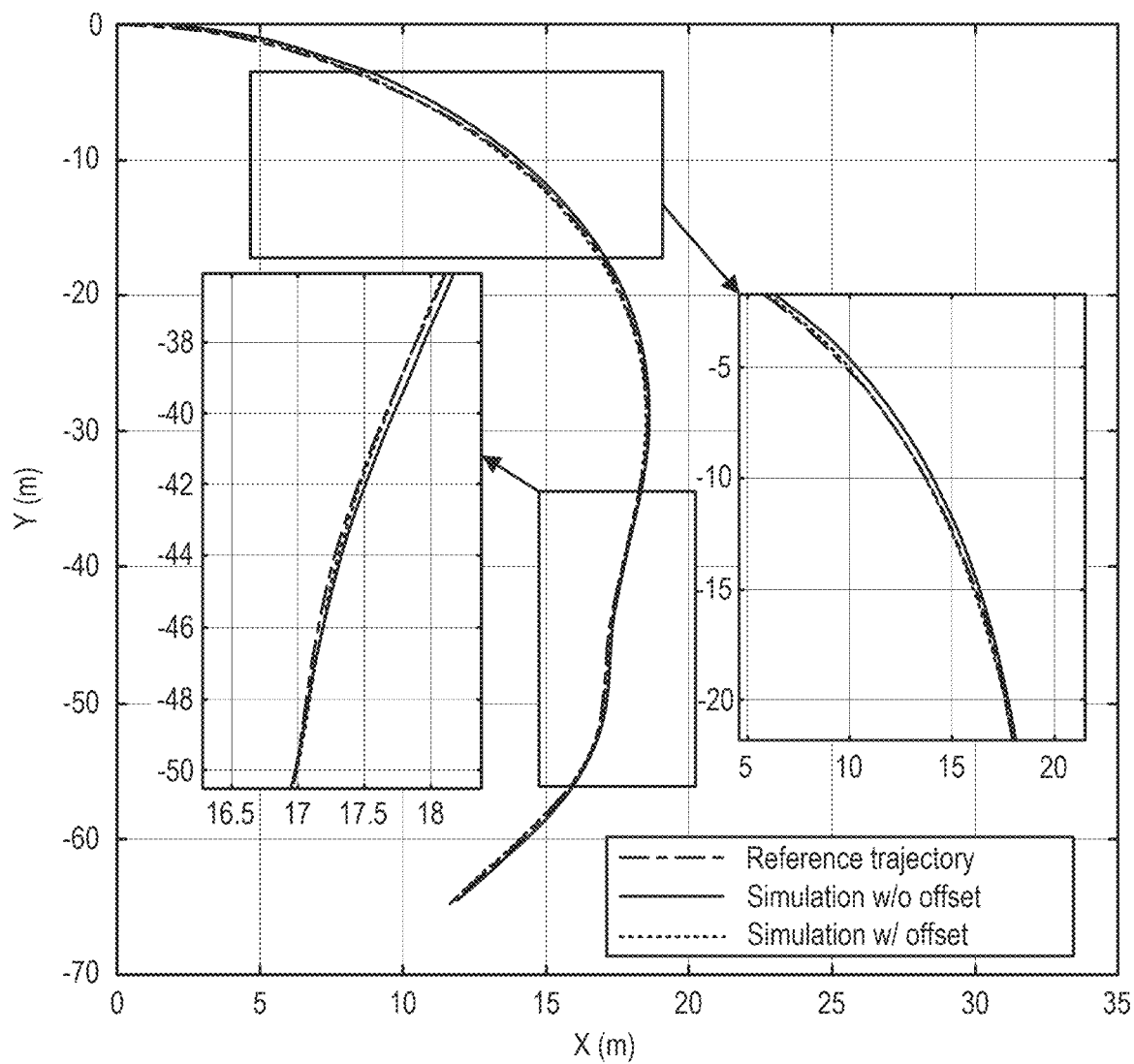
FIG. 25 shows one iteration of a lane change scenario: motion trajectory and the simulation with and without the trajectory offset.
Figure 26:
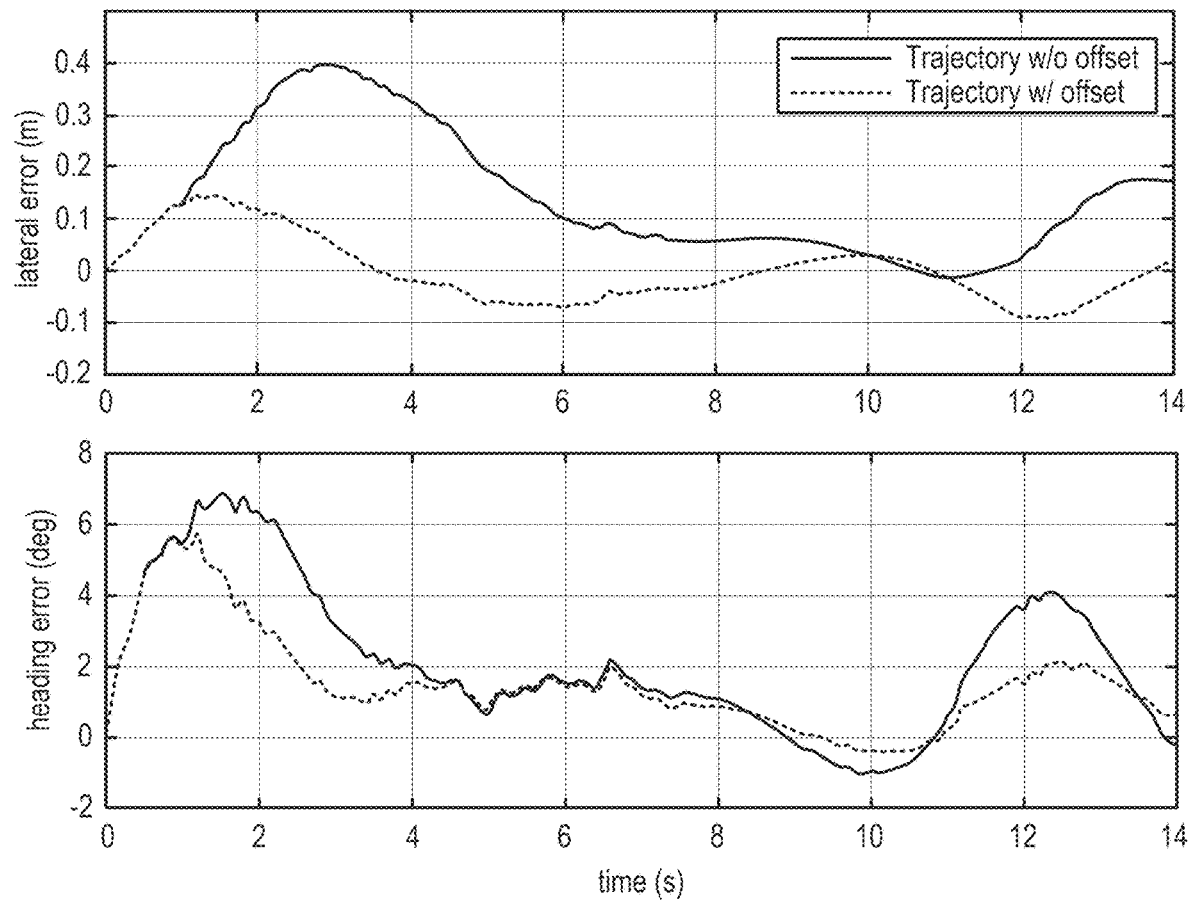
FIG. 26 shows a lane change scenario of the current disclosure with lateral and heading errors of trajectory tracking with and without the trajectory offset.

FIGS. 25 and 26 show the tracking performance and error comparison on lane change scenario. From the results, the motion controller with iterative trajectory offset also has more accurate tracking. The maximum lateral error of the proposed motion controller is about 0.15 m comparing with 0.4 m of the traditional controller. The maximum heading angle error after the first one second is about 2 degrees for the proposed motion controller compared with 4 degrees for a traditional motion controller.

The current disclosure provides an iterative optimization method proposed to improve the tracking performance of LQR-based motion controller. For the LQR-based motion controller, a look-up table is applied to expedite LQR computation. A complete robustness analysis with Monte Carlo method is provided for low and high speed controllers. The robustness of the motion controller is verified and significant parameters related with system stability are identified based on the analysis result. Furthermore, the disclosure provides an iterative optimization method verified to show its benefit on improving vehicle tracking performance The proposed iterative optimization is planning to be applied on a MPC-based motion controller and the vehicle test is being established to verify its performance.

The current disclosure provides, based on the idea of a Lebesgue state that generated waypoints do not have fixed time or distance intervals. The varying distance of each waypoint depends on the path curvature. The advantage of this is that it generates high resolution waypoints when a vehicle is planning to do a lane change or turning operation and generates low resolution waypoints when a vehicle is planning to do a simple straight lane-keeping driving operation.

The existing behavior and motion planning method of the current disclosure has a fixed trajectory precision in terms of a fixed waypoint time interval. The proposed method adjusts the waypoint interval distance based on the road and surrounding complexity. Further, the adaptive updated waypoint interval can produce precise trajectory for complicated road conditions, and also saves computational cost to decrease the update interval during simple road conditions.

Figure 27:
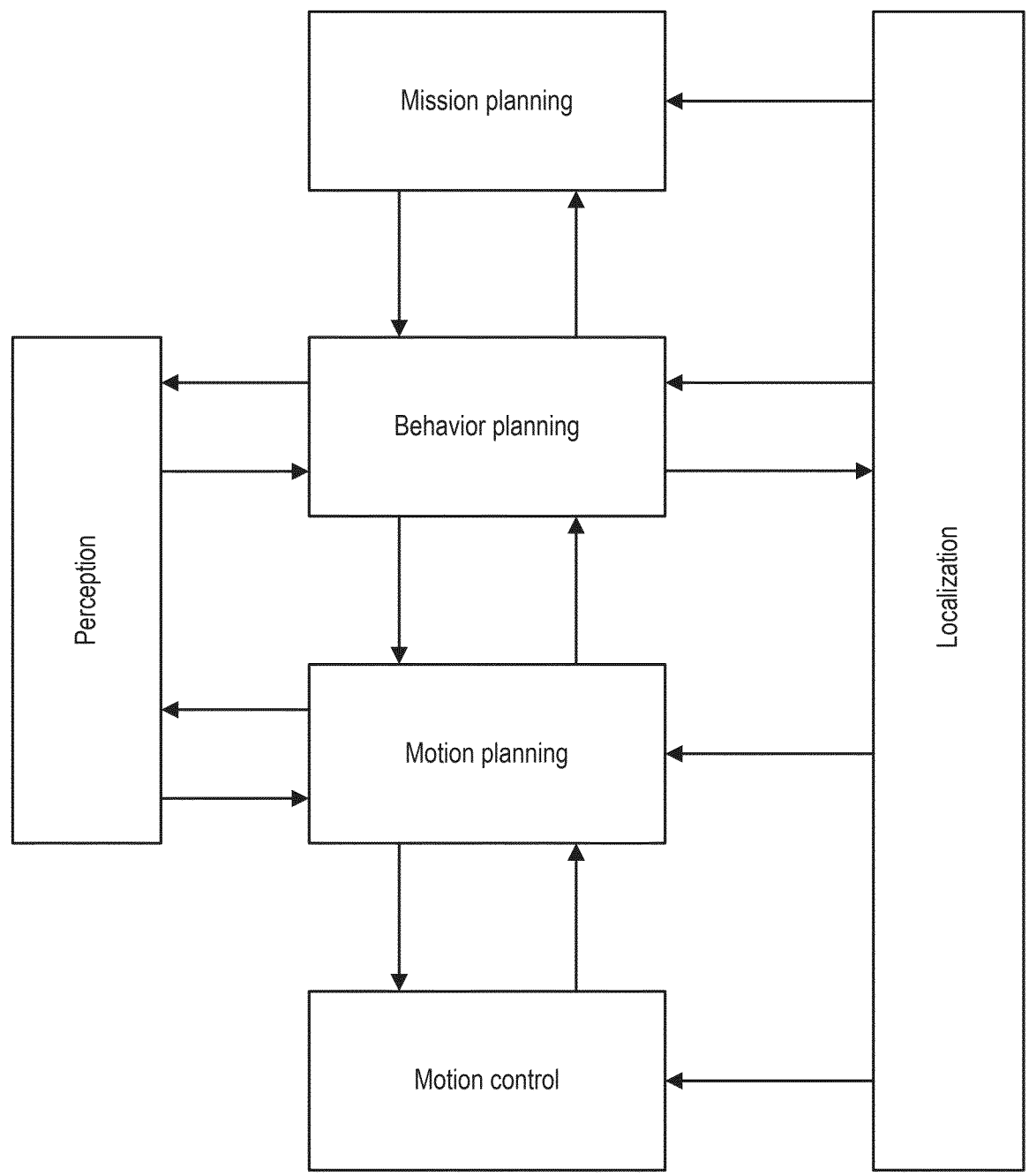
FIG. 27 shows an overall structure of an automated ADS motion planning and control system.

FIG. 27 shows the overall structure of an ADS motion planning and control system. The mission planning aims to find an efficient and low-time-consuming route along a road network from the starting location to the destination location. The disclosed behavior planning aims to utilize perception information to predict future intent and motion of other traffic participants and identify appropriate driving goals (e.g, spatial and temporal) incorporating strategic (e.g., routing), tactical (e.g., perception), and vehicle state (e.g., localization) information. Further, the current disclosure provides for computing an efficient, safe, comfortable, and dynamically feasible trajectory for the ADS to operate. The motion controller aims to drive the vehicle along the generated trajectory via motion planning safely with little motion error and little or no delay time. The mission planning, behavior planning, motion planning, and vehicle controller receive the information from perception and localization and provide feedback information in special cases.

Figure 28:
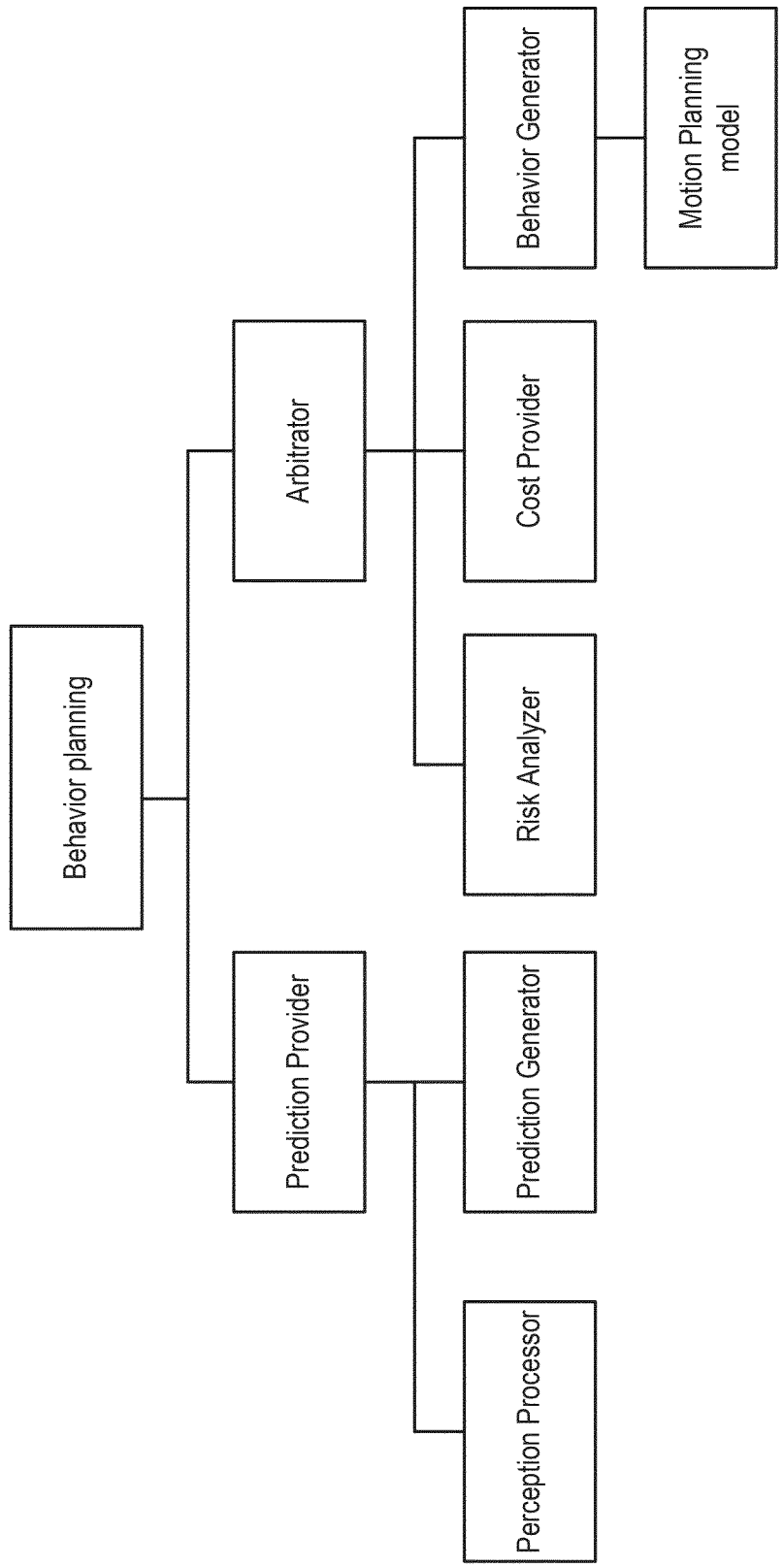
FIG. 28 shows a behavior planning subsystem.

FIG. 28 shows a behavior planning subsystem. Behavior planning has two main subsystems, prediction provider and arbitrator. The prediction is used to find the future intent and motion of other traffic participants, which includes perception processor and prediction generator; the arbitrator provides the optimal driving goals to motion planning system based on the risk analysis, cost calculation, and behavior feasible check.

Figure 29:
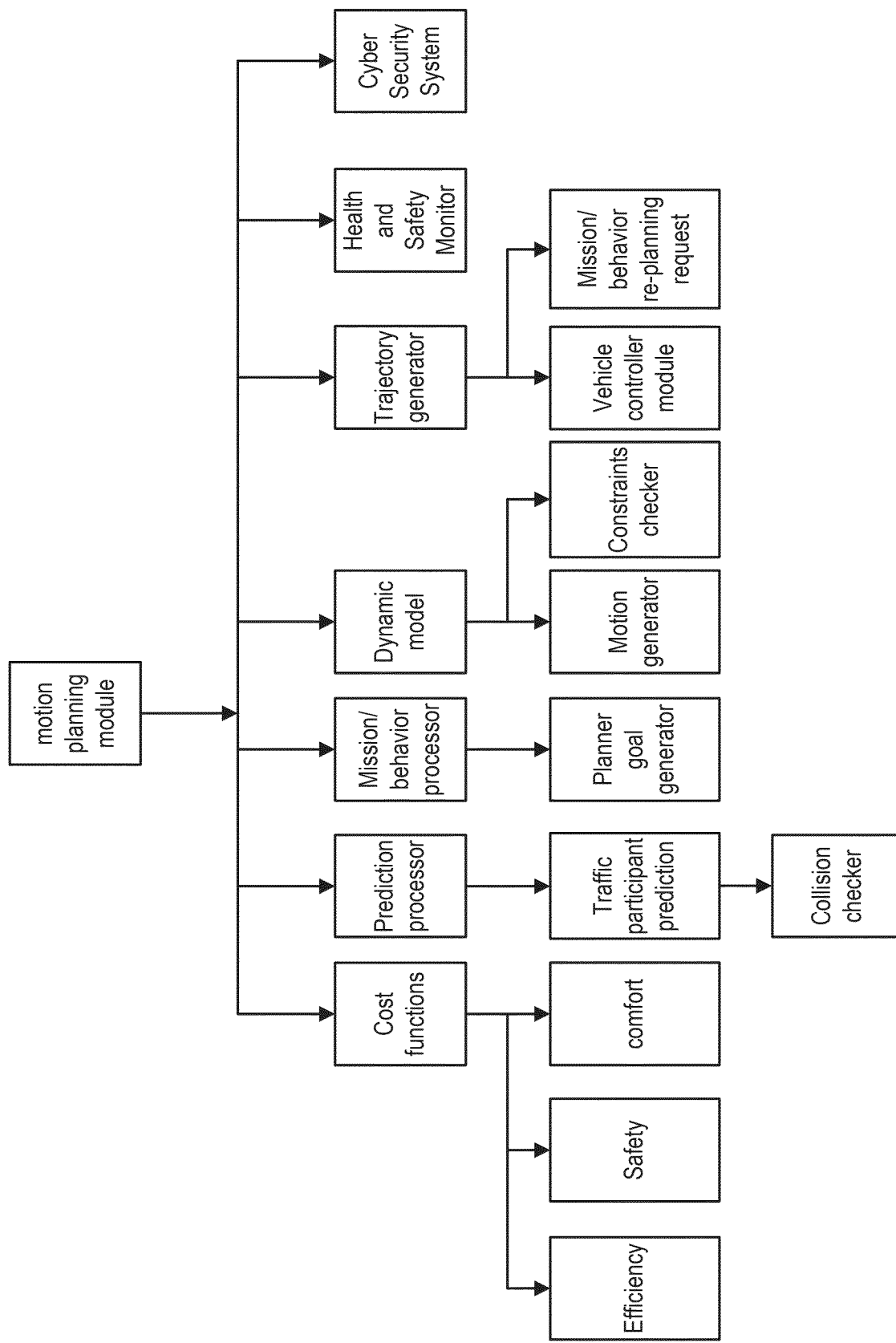
FIG. 29 shows a motion planning subsystem.

FIG. 29 shows a motion planning subsystem. The motion planning has seven subsystems: cost function, prediction processor, mission/behavior processor, dynamic model, trajectory generator, health and safety monitor, and cyber security system. The cost function is for finding an optimal motion trajectory with respect to the efficiency, safety, and comfort. The prediction processor is to predict other traffic participants to avoid collision. The mission/behavior processor is to accept the route information from mission and behavior planning. The dynamic model is to make sure a physical feasible motion trajectory with respect to the vehicle dynamic and constraints. The trajectory generator is to generate the motion trajectory and sends the trajectory to vehicle controller and the feedback information to mission and behavior planning.

Figure 30:
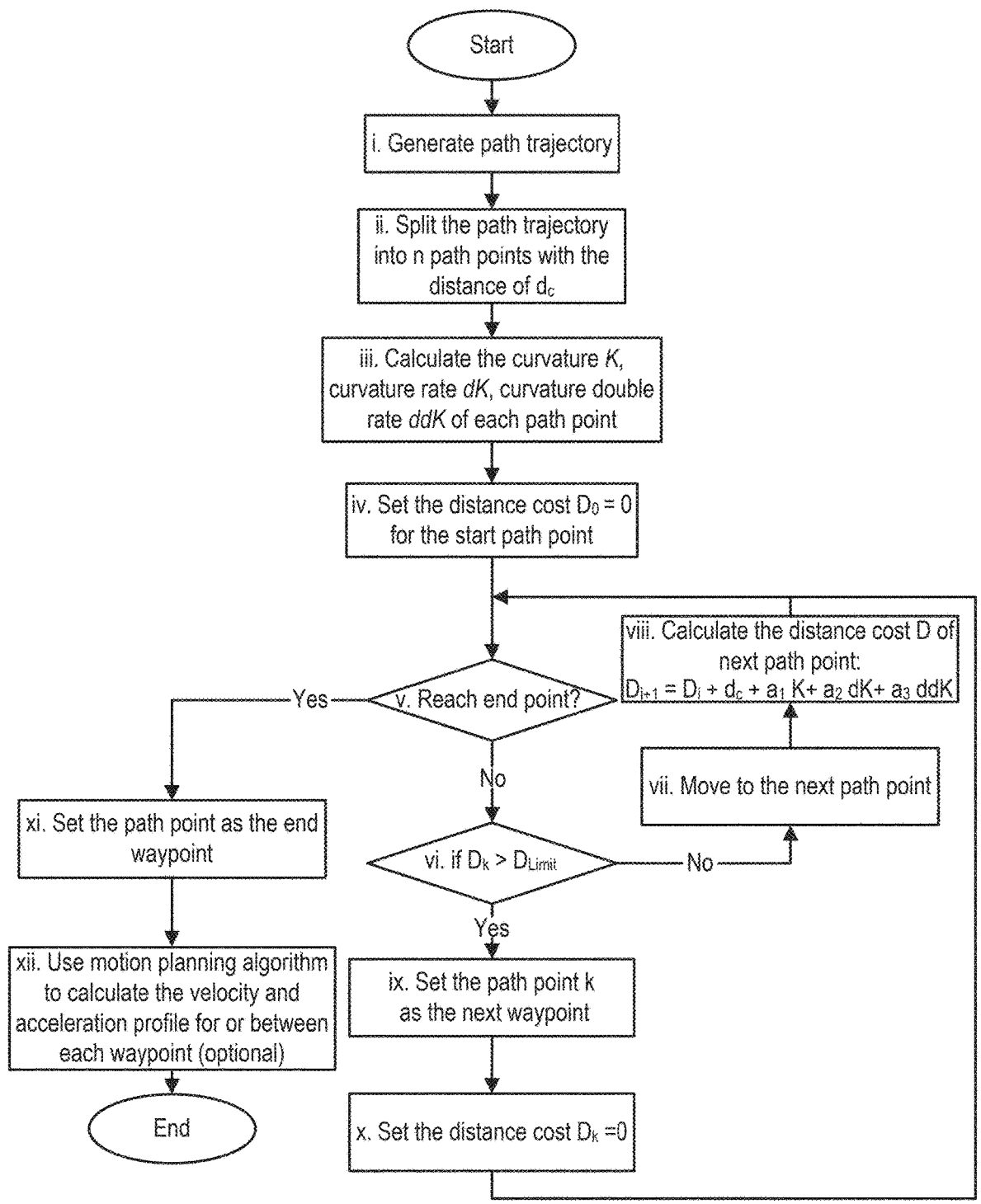
FIG. 30 shows a flowchart to decide the next waypoint of the Lebesgue-state-based behavior and motion planning of the current disclosure.

FIG. 30 shows a flowchart of how to decide the next waypoint of a Lebesgue-state-based behavior and motion planning:

i. Path planner generates a path trajectory;
ii. Split the path trajectory into n path points with the distance $d_c$, where $d_c$ is the minimum computation distance of the motion planner;
iii. Calculate the curvature K, curvature rate dK, curvature double rate ddK of each path point;
iv. Set the distance cost $D_0=0$ for the start point, and consider the current path point as $D_0$;
v. Determine whether the current path point is the end point;
vi. If step v is NO, whether the distance cost of current path point is larger than the threshold $D_{limit}$;
vii. If step vi is NO, move the current path point to the next path point;
viii. Calculate the distance cost D of the next path point as: $D_{i+1}=D_i+d_c+a_1 K+a_2 dK+a_3 ddK$, then return to step v;
ix. If step vi is YES, set the current path point $D_k$ as the next waypoint;
x. Set the distance cost $D_k=0$, return the step v;
xi. If step v is YES, set the end path point as the end waypoint; and
xii. Use a motion planning algorithm to calculate the velocity and acceleration profile for or between each waypoint (optional).

Based on the steps above, a set of path points are selected as waypoints from the path points with the highest computation resolution. The distance between each waypoint is varying based on the road complexity, then the velocity and acceleration profile of motion planning updates based on the waypoint interval.

Figure 31:
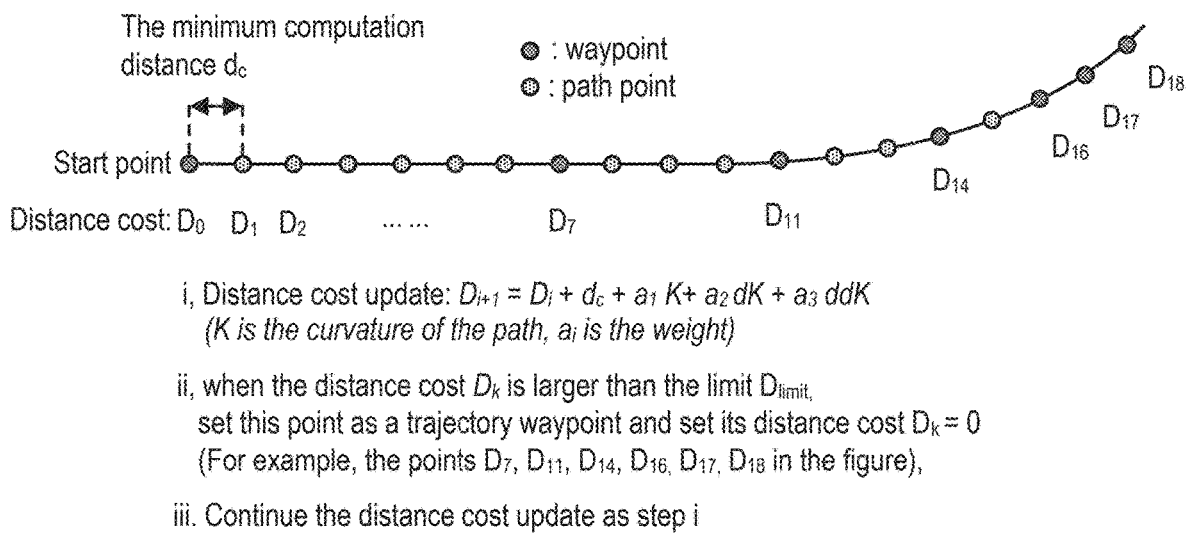
FIG. 31 shows an example of how to determine the waypoints from the path points of a path trajectory.

FIG. 31 shows an example of how to decide the waypoints from the path points of a path trajectory.

Figure 32:
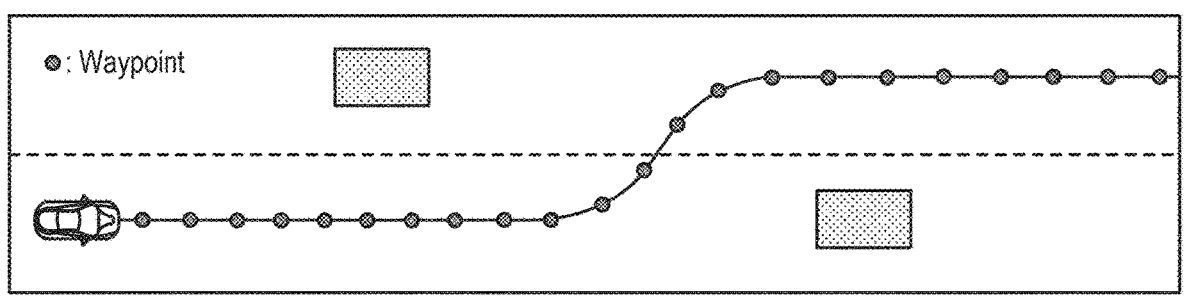
FIG. 32 shows an example of lane change with the method of regular fixed-time-interval motion planning.

FIG. 32 shows an example of a lane change with the method of regular fixed-time-interval motion planning. In this case, the generated waypoints are based on the same time interval without respect to turning, passing, and/or driving straight. During complex driving, this system cannot provide high resolution guidance to a vehicle controller due to the limit of the resolution.

Figure 33:
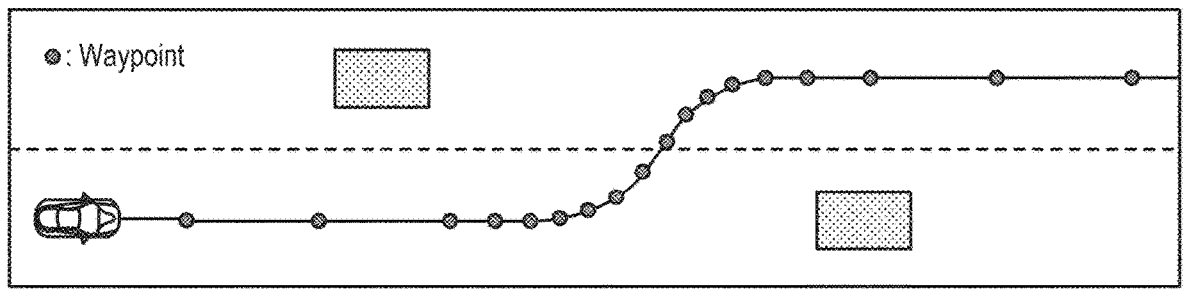
FIG. 33 shows an example of lane change with the proposed method with Lebesgue-state-based behavior and motion planning.

FIG. 33 shows an example of a lane change with the proposed method of the current disclosure employing Lebesgue-state-based behavior and motion planning. In this case, the generated waypoints are not in the fixed distance interval. The interval is based on the path complexity with the range of $[d_c, D_{limit}]$.

In a further embodiment, present disclosure relates to methods and systems for improving upon the traditional methods used for course trajectory for autonomous vehicles by considering both current and future planning trajectories to calculate a control offset for a traditional controller.

Motion control is one of the most important modules in an autonomous driving system, which is responsible to calculate control maneuvers to drive the vehicle following motion planning trajectory as close as possible. The traditional motion control methods only consider the current planning trajectory point at each step. These methods will lead to trajectory deviations and do not take advantage of the future information obtained along the voyage. The proposed motion control method, which improves upon the traditional method, considers both current and future planning trajectory to calculate a control offset on the traditional controller. This offset will significantly improve the tracking performance.

The current disclosure provides an iterative simulation-based motion controller proposed to achieve a better motion trajectory tracking while maintaining system stability. In one method, the motion controller module may be separated into two sub-modules: (1) motion control simulator; and (2) and motion control operator. The motion trajectory is first sent to the motion control simulator with a traditional motion controller to obtain the vehicle's simulated trajectory. Based on the idea of iterative learning control, this simulation repeats iteratively by updating a control input offset. By adding this control input offset, the vehicle can achieve better trajectory tracking performance while the input offset does not influence the control system stability.

The traditional motion control methods only consider current planning trajectory point each step. These method will lead to certain trajectory deviation and does not take advantage of future information. The proposed motion control method of the current disclosure, which is still based upon but improves the traditional method, considers both current and future planning trajectory to calculate a control offset on the traditional controller. By performing a series of simulations before sending out the control command, a control offset is derived and updated iteratively. This offset will significantly improve tracking performance.

In autonomous driving system (ADS), the motion controller is one the most significant modules. It needs to calculate the vehicle control maneuvers to drive the vehicle and tracking motion trajectory while keeping the passengers comfortable. For past work, several advanced control algorithms are applied to improve the motion control performance, e.g. linear quadratic regulator (LQR) and model predictive control (MPC). These control algorithms need to consider a tradeoff between the system stability and the tracking accuracy. However, it is difficult to achieve these two goals at the same time.

The current disclosure provides an iterative simulation-based motion controller to achieve better motion trajectory tracking while maintaining system stability. In this method, the motion controller module is separated into two sub-modules: (1) motion control simulator; and (2) motion control operator. The motion trajectory is first sent to the motion control simulator with a traditional motion controller to obtain the vehicle simulated trajectory. The current disclosure provides, based on the idea of iterative learning control, this simulation repeats iteratively by updating a control input offset. By adding this control input offset, the vehicle can achieve better trajectory tracking performance while the input offset does not influence the control system stability.

Figure 34:
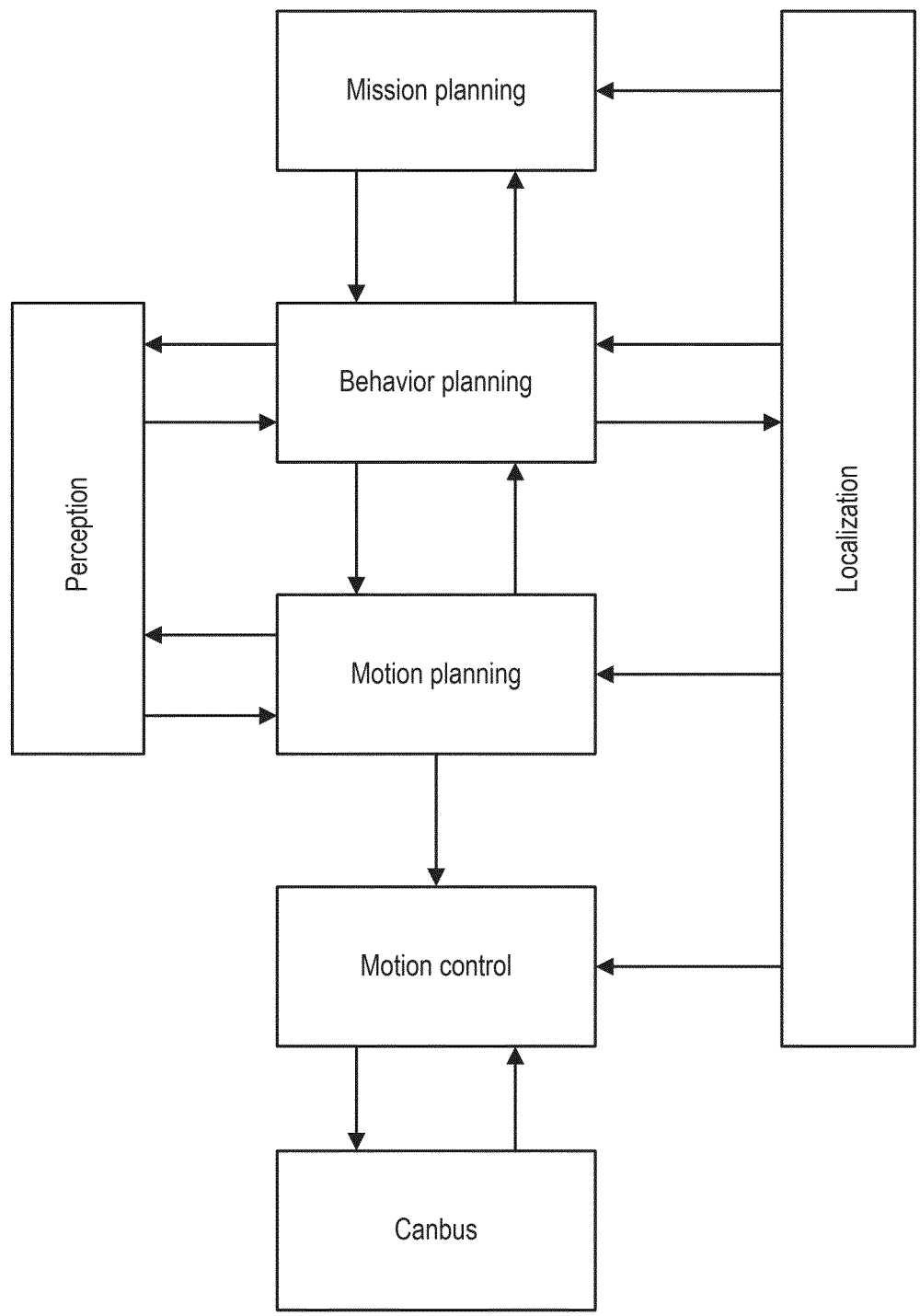
FIG. 34 shows the traditional structure of an ADS motion planning and control system.

FIG. 34 shows the traditional structure of an automated driving system (AD)S motion planning and control system. The mission planning aims to find an efficient and low-time-consuming route along a road network from the starting location to the destination location; the behavior planning aims to utilize perception information to predict future intent and motion of other traffic participants and identify appropriate driving goals (spatial and temporal) incorporating strategic (e.g. routing), tactical (e.g. perception), and vehicle state (e.g. localization) information; the motion planning aims to compute an efficient, safe, comfortable, and dynamically feasible trajectory for ADS to operate; the motion controller aims to drive the vehicle along the generated trajectory from motion planning safely and stably with little trajectory error. The mission planning, behavior planning, motion planning, and vehicle controller receive the information from perception and localization and may provide feedback information in some cases. To be noticed, the signal communication between motion planning and motion control is unidirectional.

Figure 35:
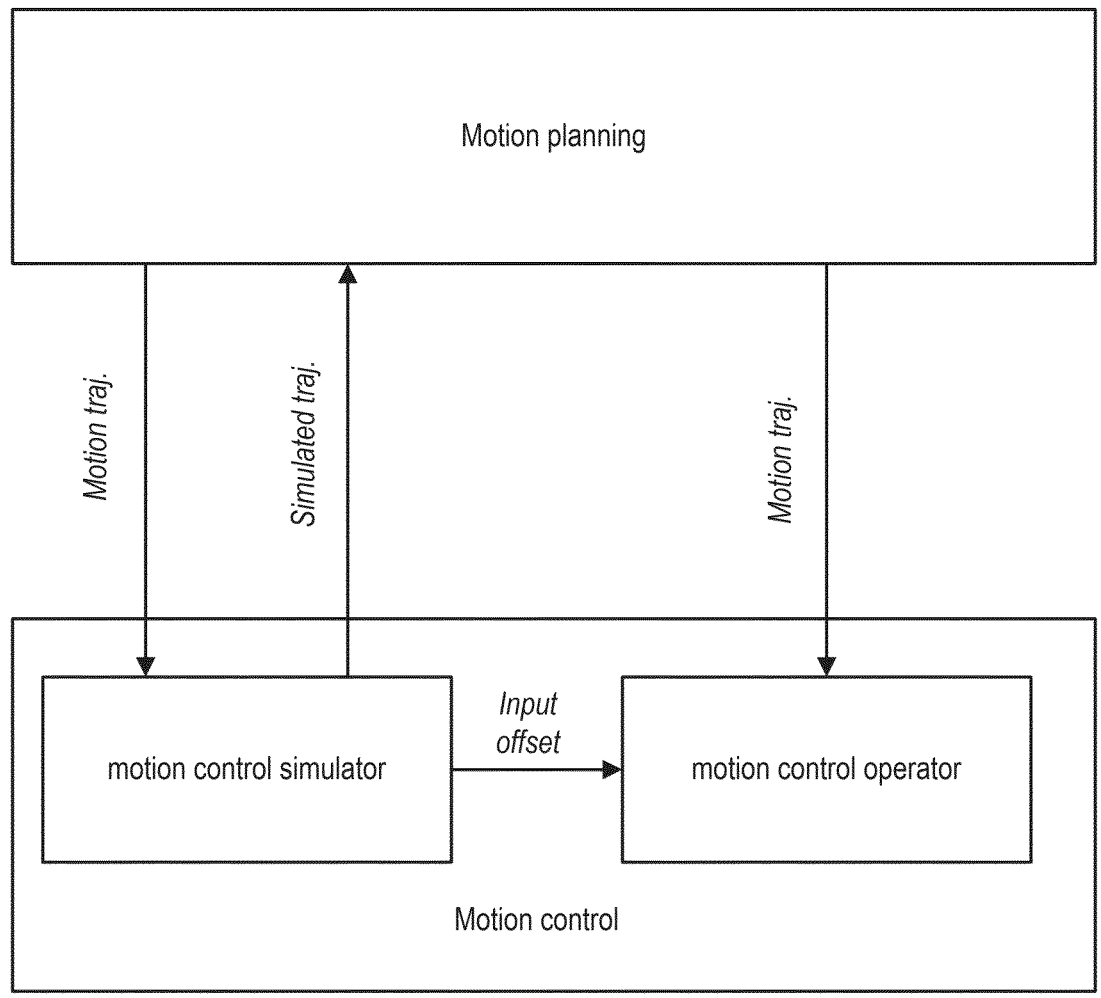
FIG. 35 shows the proposed structure of ADS motion planning and motion control structure.

FIG. 35 shows the proposed structure of an ADS motion planning and motion control structure. The motion controller module is split into two parts, motion control simulator and motion control operator. The motion trajectory is first sent to the motion control simulator to obtain the vehicle simulated trajectory. For the present disclosure, this process may be executed iteratively by updating a control input offset. The offset will improve the tracking performance and may be sent to the motion control operator. The simulated trajectory is then sent back to motion planning for further trajectory evaluation. For the motion control operator, it will receive the original motion trajectory from the motion planning as the reference input, and the input offset from motion control simulator to improve the performance.

Figure 36:
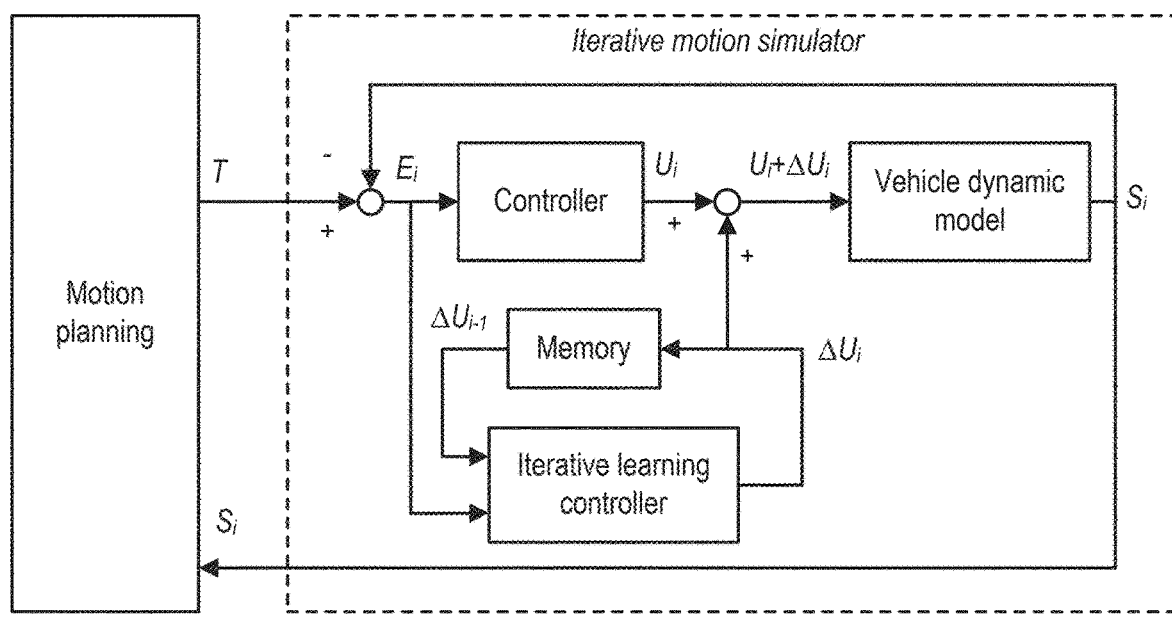
FIG. 36 shows a diagram of an iterative motion control simulator.

FIG. 36 shows a diagram of an iterative motion control simulator. The controller consists of the traditional motion controller, vehicle dynamic model, and iterative control module (where i indicates the iteration). The trajectory T is first sent from motion planning to motion simulator, and the simulated trajectory is obtained by executing this simulation. The simulated trajectory is also sent back to motion planning as a feedback signal. Besides those, the iterative motion control, consisting of the iterative learning controller and a memory unit, is inserted to calculate the input offset $\Delta U$. The input offset $\Delta U$ will be updated iteratively to improve the tracking performance.

Figure 37:
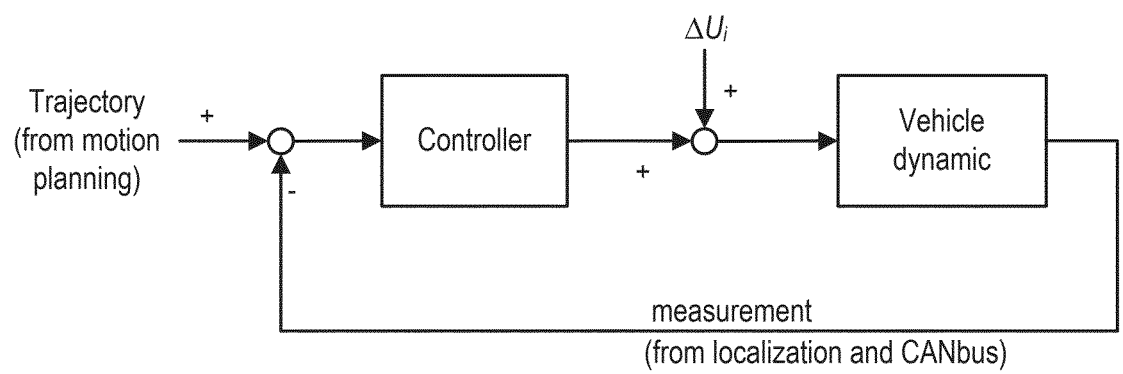
FIG. 37 shows the control diagram of motion control operator.
Figure 38A:
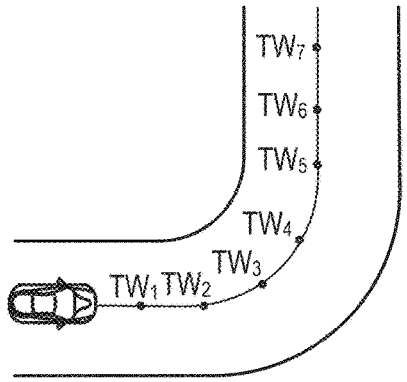
FIG. 38 shows an example of the proposed iterative motion controller.
Figure 38B:
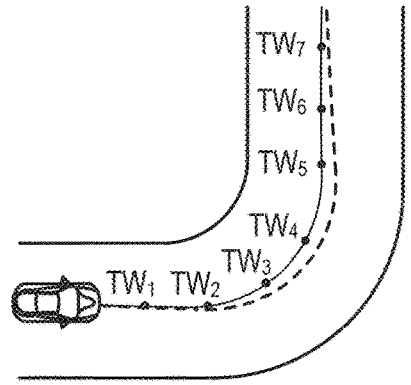
Figure 38C:
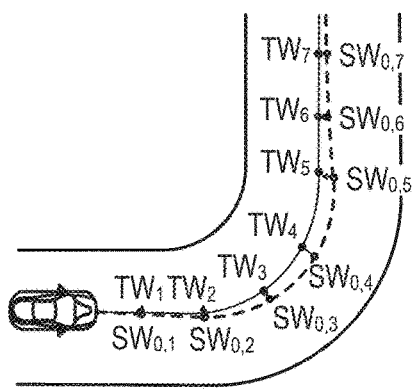
Figure 38D:
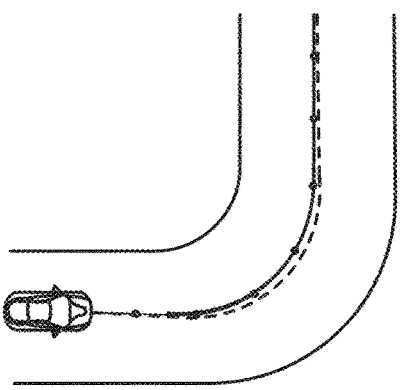
Figure 38E:
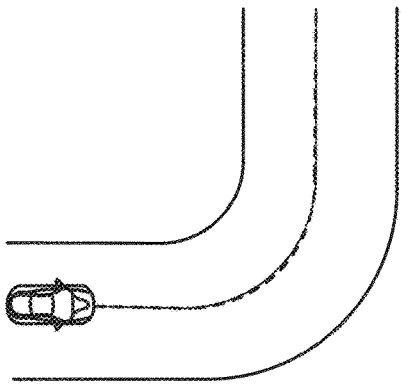

FIG. 37 shows a control diagram of a motion control operator. The trajectory from the motion planning is the reference of the system. The feedback signals are related the vehicle motion status from localization module and CAN-bus. The input offset $\Delta U$ is plugged as a feed-forward input of the system. System stability is related with the control loop gain. The input offset does not influence the control loop gain, therefore it will not influence the control system stability.

FIG. 38 shows an example of the proposed iterative motion controller. In FIG. 38 at (a), the motion planning generates an initial motion trajectory in terms of a set of trajectory waypoints $TW_{1\sim n}$ with a fixed time interval. For each waypoint $TW_i$, it contains the desired motion information, including but not limited to, the coordination X, Y, heading angle $\Psi$, linear velocity v, acceleration a, curvature K $$TW=[X, Y, \psi, v, a, K]^T$$

In FIG. 38 at (b), the motion control simulator estimates the vehicle simulated trajectory waypoint $SW_{j,i}$ by following these trajectory waypoints (j: iteration, i: simulated trajectory waypoint index).

In FIG. 38 at (c), by calculating the tracking error as:

$$E_{j,i}=(TW_{0,i}-SW_{j,i})$$

a set of control offset can be derived as:

$$\Delta U_{(j+1),n}=\Delta U_{j,n}+KE_{j,n}$$

where K is the matrix of learning gains with the form of $K=\text{diag}(k_1, k_2, \ldots, k_n)$, $k_i$ is corresponding to each element of TW.

In FIG. 38 at (d), the tracking performance will continuously improve when updating this iterative control input offset.

In FIG. 38 at (e), this adjusting process runs for several iterations until a satisfactory simulation performance is obtained when $$E_j^T Q E_j < \varepsilon$$

where the weight matrix Q is positive definitive matrix, or reaches the maximum number in of iteration. Then the final input offset $\Delta U_j$ is sent to motion control operator.

Figure 39:
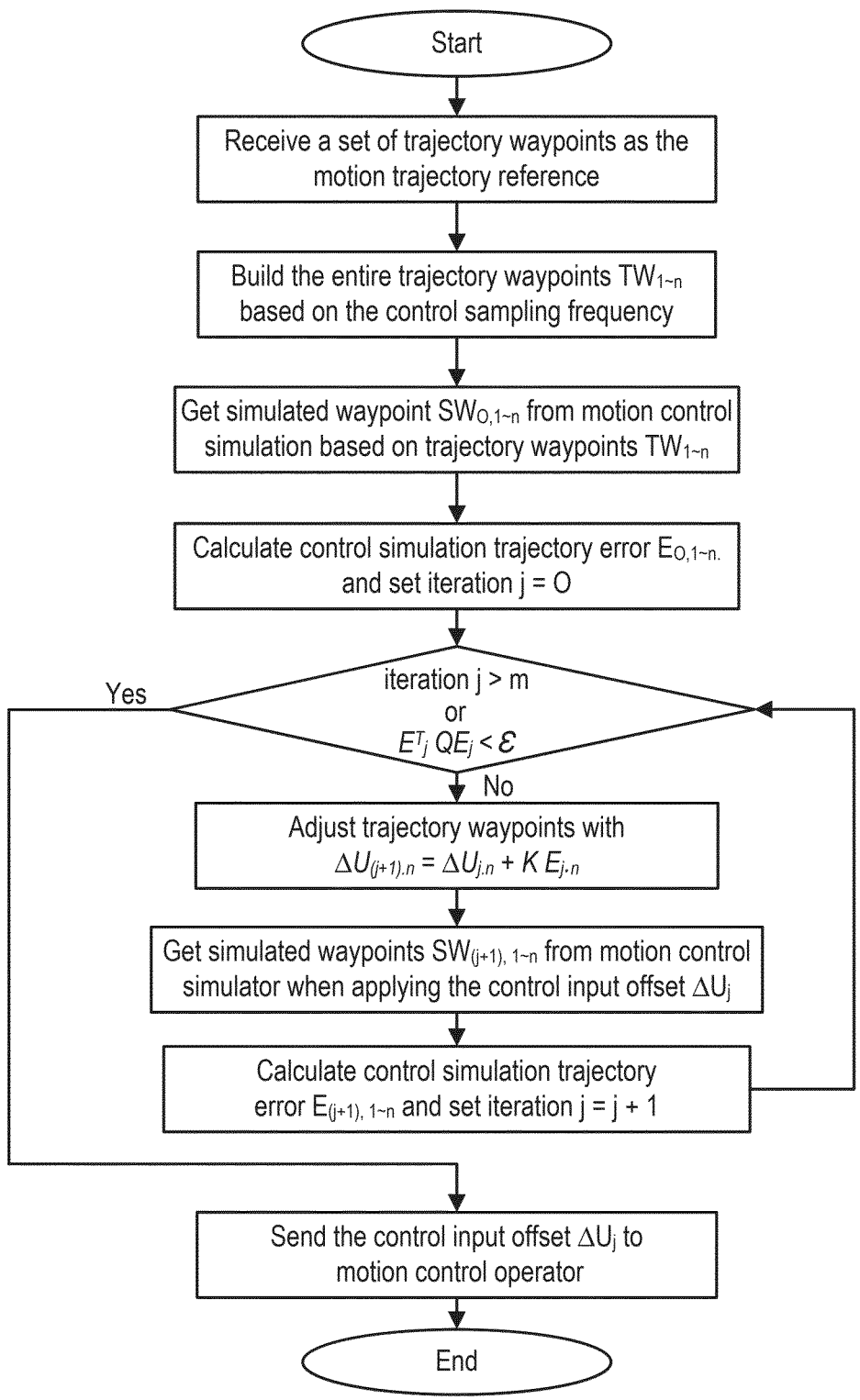
FIG. 39 shows a flow chart for application of an iterative motion controller.

FIG. 39 is a flow chart showing application of an iterative motion controller.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A feedback connection system between motion control and motion planning for an autonomous driving vehicle comprising:
   a motion controller, wherein the motion controller further comprises;
      an iterative motion simulator, wherein the iterative motion simulator simulates a vehicle trajectory response while updating a trajectory offset; and
      a motion control operator that evaluates the simulated vehicle trajectory;
   a real time motion planner that evaluates the simulated trajectory for physical trajectory physical and operational feasibility based on at least one motion planning requirement;
   a feedback connection established between the motion controller to the motion planner wherein tracking error is calculated and transmitted from the motion controller to the motion planner and motion trajectory of the autonomous driving vehicle is adjusted by the motion planner until tracking performance error is smaller than a preset threshold or a maximum number of iterations is reached;
   wherein the motion controller receives a trajectory offset from the motion planner and calculates a vehicle control maneuver based on the trajectory offset;
   the motion planner generates a motion trajectory for a time horizon and the motion control operator executes a motion planning trajectory for the time horizon;
   wherein the motion controller, via the received vehicle control maneuver, will change a course and a direction of the autonomous driving vehicle based on the motion trajectory generated by the motion planner as well as evaluate a planned response of the autonomous driving vehicle to the vehicle control maneuver and predict the planned response of the autonomous driving vehicle, wherein if the planned response of the autonomous driving vehicle cannot follow the motion trajectory generated by the motion planner, determined by a calculated tracking error value compared to a trajectory offset value meeting at least one prescribed threshold value, a new course and direction will be planned that the autonomous vehicle can follow;

wherein the trajectory offset from iterative motion planning reduces lateral error and heading error of the autonomous driving vehicle as compared to not employing a trajectory offset from iterative motion planning;

utilizing, via at least one perception processor, at least one piece of perception information to predict future motion of at least one other traffic participant;

update the motion trajectory based on the at least one piece of perception information and change the course and direction of the autonomous driving vehicle.

2. The feedback connection system of claim 1, wherein the motion controller further comprises a lateral controller and a longitudinal controller.

3. The feedback connection system of claim 1, $$\Delta P_i = \Delta P_{i-1} + K_{ILC} E_i;$$

wherein the trajectory offset is derived as wherein $\Delta P_i$ is a trajectory offset;
wherein $\Delta P_{i-1}$ is a previous iteration trajectory offset;
wherein $K_{ILC}$ is an iterative learning control gain matrix; and
wherein $E_i$ is a tracking error.

4. The feedback connection system of claim 1, wherein a tracking error is obtained at an i-th iteration as $$E_i = P_0 - S_i = \{e_1 e_2, \ldots, e_n\}_i;$$

wherein $E_i$ is a tracking error;
P0 is an initial trajectory; and
Si is a motion trajectory.

5. The feedback connection system of claim 4, wherein the trajectory offset and the tracking error are sent to the motion planner as feedback information.

6. The feedback connection system of claim 1, wherein the simulated vehicle trajectory is obtained from $$S_i = \{s0, s1, \ldots sn\}i;$$

wherein Si is a motion trajectory.

7. The feedback connection system of claim 1, wherein if the simulated trajectory does not meet a motion planning requirement this triggers a motion trajectory regeneration.

8. The feedback connection system of claim 1, wherein if the simulated trajectory does not meet a mission and behavior planning requirement, at least one alternative simulated trajectory will be created by the motion planner.

9. The feedback connection system of claim 8, wherein once the simulated trajectory meets the mission and behavior planning, the motion control operator executes the simulated trajectory until reaching a destination.

10. An iterative feedback motion planning system comprising:

a real-time motion planner that generates an initial motion trajectory via a set of trajectory waypoints with a fixed time interval;

a motion control simulator estimates a vehicle simulated trajectory in view of the trajectory waypoints and simulated waypoints corresponding to the trajectory waypoints are selected from the vehicle simulated trajectory;

a feedback connection established between the motion control simulator to the real time motion planner wherein a tracking error is calculated and transmitted from the motion control simulator to the real time motion planner and motion trajectory of the autonomous driving vehicle is adjusted by the real time motion planner until tracking performance error is smaller than a preset threshold or a maximum number of iterations is reached;

the motion control simulator applies the adjusted motion trajectory waypoints and creates an updated simulated trajectory and further simulated waypoints;

the motion control simulator determines a satisfied simulation performance and a final adjusted motion trajectory is sent to a motion control operator;

wherein the motion controller simulator, via the adjusted motion trajectory waypoints, will change a course and a direction of an autonomous driving vehicle based on the updated simulated trajectory as well as evaluate a planned response of the autonomous driving vehicle to the adjusted motion trajectory waypoints and predict the planned response of the autonomous driving vehicle, wherein if the planned response of the autonomous driving vehicle cannot follow the motion trajectory generated by the motion planner, determined by a calculated tracking error value compared to a trajectory offset value meeting at least one prescribed threshold value, a new course and direction will be planned that the autonomous vehicle can follow;

wherein a trajectory offset from iterative motion planning reduces lateral error and heading error of the autonomous driving vehicle as compared to not employing a trajectory offset from iterative motion planning;

utilizing via at least one perception processor, at least one piece of perception information to predict future motion of at least one other traffic participant;

update the motion trajectory based on the at least one piece of perception information and change the course and direction of the autonomous driving vehicle.

11. The iterative feedback motion planning system of claim 10, wherein each trajectory waypoint comprises X and Y coordinates, heading angle, linear velocity and acceleration.

12. The iterative feedback motion planning system of claim 10, wherein the tracking error is defined as $$E_{0,1} = (TW_{0,i} 31\ TW_{0,1})$$

wherein $E_{0,i}$ a tracking error; and
wherein TW is a waypoint.

13. The iterative feedback motion planning system of claim 10 wherein the adjusted motion trajectory waypoints are obtained $$TW_{(j+1),n} = TW_{j,n} + KE_{j,n}$$

via wherein $TW_{(j+1),n}$ is an adjusted motion trajectory waypoint;
wherein $TW_{j,n}$ is an adjusted waypoint;
wherein K is a matrix of learning gains
wherein $E_{j,n}$ is an error of simulated waypoints.

14. The iterative feedback motion planning system of claim 10, wherein an adjusting process is applied until the satisfied simulation performance is obtained when $$E_j^T Q E_j < \varepsilon$$

wherein T is trajectory;
wherein Q is a weight matrix; and
wherein Ej is error iteration.

15. The iterative feedback motion planning system of claim 10, further comprising a lateral controller.

16. The iterative feedback motion planning system of claim 10, wherein an optimal lateral feedback gain for a varying longitudinal velocity is obtained and communicated to the motion controller.

17. The iterative feedback motion planning system of claim 10, wherein the motion controller is a LQR-based motion controller.

18. The iterative feedback motion planning system of claim 17, wherein a look-up table is applied to expedite LQR computation.

* * * * *